(12) United States Patent
Johnson et al.

(10) Patent No.: US 12,141,834 B1
(45) Date of Patent: *Nov. 12, 2024

(54) SYSTEM AND METHOD FOR MANAGEMENT OF EMAIL MARKETING CAMPAIGNS

(71) Applicant: Overstock.com, Inc., Midvale, UT (US)

(72) Inventors: Bradford Hardy Johnson, Salt Lake City, UT (US); Michael David Breitenbeker, Salt Lake City, UT (US); Joshua Lloyd Selleneit, Salt Lake City, UT (US); Jessica Leigh Hughes, Salt Lake City, UT (US); Catherine Diaz, Salt Lake City, UT (US)

(73) Assignee: Overstock.com, Inc., Midvale, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/202,012

(22) Filed: Mar. 15, 2021

Related U.S. Application Data

(63) Continuation of application No. 13/663,353, filed on Oct. 29, 2012, now Pat. No. 10,949,876.

(51) Int. Cl.
  *G06Q 30/0251* (2023.01)
(52) U.S. Cl.
  CPC ................. *G06Q 30/0251* (2013.01)
(58) Field of Classification Search
  CPC ............. G06Q 30/0251; G06Q 30/0207–0277
  See application file for complete search history.

(56) References Cited

U.S. PATENT DOCUMENTS

| | | | |
|---|---|---|---|
| 3,573,747 | A | 4/1971 | Adams et al. |
| 3,581,072 | A | 5/1971 | Nymeyer |

(Continued)

FOREIGN PATENT DOCUMENTS

| | | |
|---|---|---|
| CA | 2253543 | 3/1997 |
| CA | 2347812 | 5/2000 |

(Continued)

OTHER PUBLICATIONS

Teo, "Organizational Factors of Success in Using EDIS: A Survey of Tradenet Participants," Electronic Markets—The International Journal, Oct. 1993, 2 pages, vol. 3, No. 3.

(Continued)

*Primary Examiner* — Chinyere Mpamugo
(74) *Attorney, Agent, or Firm* — Clayton Howarth, P.C.

(57) ABSTRACT

Systems, programs, non-transitory computer readable mediums, and methods of managing multiple and concurrent online advertising campaigns to eliminate user fatigue are disclosed. In particular, a campaign management server generates multiple target lists of users from a data warehouse for a plurality of pre-defined online advertising campaigns. The users on the target lists are selected to receive electronic communications, such as email or text, containing advertisements based upon target profiles associated with the campaigns as determined by marketing objectives. The advertising campaigns are prioritized such that users on a target list of a higher prioritized campaign are suppressed from lower prioritized campaigns in order to insure that the users receive a predetermined number of electronic communications within a set time frame.

19 Claims, 5 Drawing Sheets

(56) References Cited

U.S. PATENT DOCUMENTS

| | | |
|---|---|---|
| 4,412,287 A | 10/1983 | Braddock, III |
| 4,674,044 A | 6/1987 | Kalmus et al. |
| 4,677,552 A | 6/1987 | Sibley, Jr. |
| 4,789,928 A | 12/1988 | Fujisaki |
| 4,799,156 A | 1/1989 | Shavit et al. |
| 4,808,987 A | 2/1989 | Takeda et al. |
| 4,823,265 A | 4/1989 | Nelson |
| 4,854,516 A | 8/1989 | Yamada |
| 4,903,201 A | 2/1990 | Wagner |
| RE33,316 E | 8/1990 | Katsuta et al. |
| 5,027,110 A | 6/1991 | Chang et al. |
| 5,053,956 A | 10/1991 | Donald et al. |
| 5,063,507 A | 11/1991 | Lindsey et al. |
| 5,077,665 A | 12/1991 | Silverman et al. |
| 5,101,353 A | 3/1992 | Lupien et al. |
| 5,136,501 A | 8/1992 | Silverman et al. |
| 5,168,446 A | 12/1992 | Wiseman |
| 5,205,200 A | 4/1993 | Wright |
| 5,243,515 A | 9/1993 | Lee |
| 5,258,908 A | 11/1993 | Hartheimer et al. |
| 5,280,422 A | 1/1994 | Moe et al. |
| 5,297,031 A | 3/1994 | Gutterman et al. |
| 5,297,032 A | 3/1994 | Trojan et al. |
| 5,301,350 A | 4/1994 | Rogan et al. |
| 5,305,200 A | 4/1994 | Hartheimer et al. |
| 5,325,297 A | 6/1994 | Bird et al. |
| 5,329,589 A | 7/1994 | Fraser et al. |
| 5,347,632 A | 9/1994 | Filepp et al. |
| 5,375,055 A | 12/1994 | Togher et al. |
| 5,377,354 A * | 12/1994 | Scannell ............... H04L 51/42  706/45 |
| 5,394,324 A | 2/1995 | Clearwater |
| 5,407,433 A | 4/1995 | Loomas |
| 5,411,483 A | 5/1995 | Loomas et al. |
| 5,426,281 A | 6/1995 | Abecassis |
| 5,485,510 A | 1/1996 | Colbert |
| 5,493,677 A | 2/1996 | Balogh et al. |
| 5,553,145 A | 9/1996 | Micali |
| 5,557,728 A | 9/1996 | Garrett et al. |
| 5,579,471 A | 11/1996 | Barber et al. |
| 5,596,994 A | 1/1997 | Bro |
| 5,598,557 A | 1/1997 | Doner et al. |
| 5,621,790 A | 4/1997 | Grossman et al. |
| 5,640,569 A | 6/1997 | Miller et al. |
| 5,657,389 A | 8/1997 | Houvener |
| 5,664,111 A | 9/1997 | Nahan et al. |
| 5,664,115 A | 9/1997 | Fraser |
| 5,689,652 A | 11/1997 | Lupien et al. |
| 5,694,546 A | 12/1997 | Reisman |
| 5,706,457 A | 1/1998 | Dwyer et al. |
| 5,710,889 A | 1/1998 | Clark et al. |
| 5,715,314 A | 2/1998 | Payne et al. |
| 5,715,402 A | 2/1998 | Popolo |
| 5,717,989 A | 2/1998 | Tozzoli et al. |
| 5,721,908 A | 2/1998 | Lagarde et al. |
| 5,722,418 A | 3/1998 | Bro |
| 5,727,165 A | 3/1998 | Ordish et al. |
| 5,737,599 A | 4/1998 | Rowe et al. |
| 5,760,917 A | 6/1998 | Sheridan |
| 5,761,496 A | 6/1998 | Hattori |
| 5,761,655 A | 6/1998 | Hoffman |
| 5,761,662 A | 6/1998 | Dasan |
| 5,771,291 A | 6/1998 | Newton et al. |
| 5,771,380 A | 6/1998 | Tanaka et al. |
| 5,778,367 A | 7/1998 | Wesinger, Jr. et al. |
| 5,790,790 A | 8/1998 | Smith et al. |
| 5,794,216 A | 8/1998 | Brown |
| 5,794,219 A | 8/1998 | Brown |
| 5,796,395 A | 8/1998 | de Hond |
| 5,799,285 A | 8/1998 | Klingman |
| 5,803,500 A | 9/1998 | Mossberg |
| 5,818,914 A | 10/1998 | Fujisaki |
| 5,826,244 A | 10/1998 | Huberman |
| 5,835,896 A | 11/1998 | Fisher et al. |
| 5,845,265 A | 12/1998 | Woolston |
| 5,845,266 A | 12/1998 | Lupien et al. |
| 5,850,442 A | 12/1998 | Muftic |
| 5,870,754 A | 2/1999 | Dimitrova et al. |
| 5,872,848 A | 2/1999 | Romney et al. |
| 5,873,069 A | 2/1999 | Reuhl et al. |
| 5,873,080 A | 2/1999 | Coden et al. |
| 5,884,056 A | 3/1999 | Steele |
| 5,890,138 A | 3/1999 | Godin et al. |
| 5,890,175 A | 3/1999 | Wong et al. |
| 5,905,975 A | 5/1999 | Ausubel |
| 5,907,547 A | 5/1999 | Foldare et al. |
| 5,913,215 A | 6/1999 | Rubinstein et al. |
| 5,922,074 A | 7/1999 | Richard et al. |
| 5,924,072 A | 7/1999 | Havens |
| 5,926,794 A | 7/1999 | Fethe |
| 5,948,040 A | 9/1999 | DeLorme et al. |
| 5,948,061 A | 9/1999 | Merriman et al. |
| 5,956,640 A | 9/1999 | Eaton et al. |
| 5,970,490 A | 10/1999 | Morgenstern |
| 5,974,396 A | 10/1999 | Anderson et al. |
| 5,974,412 A | 10/1999 | Hazlehurst et al. |
| 5,986,662 A | 11/1999 | Argiro et al. |
| 5,987,446 A | 11/1999 | Corey et al. |
| 5,991,739 A | 11/1999 | Cupps et al. |
| 5,999,915 A | 12/1999 | Nahan et al. |
| 6,012,053 A | 1/2000 | Pant et al. |
| 6,029,141 A | 2/2000 | Bezos et al. |
| 6,035,288 A | 3/2000 | Solomon |
| 6,035,402 A | 3/2000 | Vaeth et al. |
| 6,044,363 A | 3/2000 | Mori et al. |
| 6,045,447 A | 4/2000 | Yoshizawa et al. |
| 6,047,264 A | 4/2000 | Fisher et al. |
| 6,049,797 A | 4/2000 | Guha et al. |
| 6,055,518 A | 4/2000 | Franklin et al. |
| 6,058,379 A | 5/2000 | Odom et al. |
| 6,058,417 A | 5/2000 | Hess et al. |
| 6,058,428 A | 5/2000 | Wang et al. |
| 6,061,448 A | 5/2000 | Smith et al. |
| 6,065,041 A | 5/2000 | Lum et al. |
| 6,070,125 A | 5/2000 | Murphy et al. |
| 6,073,117 A | 6/2000 | Oyanagi et al. |
| 6,078,914 A | 6/2000 | Redfern |
| 6,085,176 A | 7/2000 | Woolston |
| 6,104,815 A | 8/2000 | Alcorn et al. |
| 6,119,137 A | 9/2000 | Smith et al. |
| 6,128,649 A | 10/2000 | Smith et al. |
| 6,141,010 A | 10/2000 | Hoyle |
| 6,167,382 A | 12/2000 | Sparks et al. |
| 6,178,408 B1 | 1/2001 | Copple et al. |
| 6,185,558 B1 | 2/2001 | Bowman et al. |
| 6,192,407 B1 | 2/2001 | Smith et al. |
| 6,199,077 B1 | 3/2001 | Inala et al. |
| 6,202,051 B1 | 3/2001 | Woolston |
| 6,202,061 B1 | 3/2001 | Khosla et al. |
| 6,226,412 B1 | 5/2001 | Schwab |
| 6,243,691 B1 | 6/2001 | Fisher et al. |
| 6,269,238 B1 | 7/2001 | Iggulden |
| 6,271,840 B1 | 8/2001 | Finseth et al. |
| 6,275,820 B1 | 8/2001 | Navin-Chandra et al. |
| 6,275,829 B1 | 8/2001 | Angiulo et al. |
| 6,356,879 B2 | 3/2002 | Aggarwal et al. |
| 6,356,905 B1 | 3/2002 | Gershman et al. |
| 6,356,908 B1 | 3/2002 | Brown et al. |
| 6,366,899 B1 | 4/2002 | Kernz |
| 6,370,527 B1 | 4/2002 | Singhal |
| 6,373,933 B1 | 4/2002 | Sarkki et al. |
| 6,374,260 B1 | 4/2002 | Hoffert et al. |
| 6,381,510 B1 | 4/2002 | Amidhozour et al. |
| 6,415,270 B1 | 7/2002 | Rackson et al. |
| 6,415,320 B1 | 7/2002 | Hess et al. |
| 6,434,556 B1 | 8/2002 | Levin et al. |
| 6,452,609 B1 | 9/2002 | Katinsky et al. |
| 6,456,307 B1 | 9/2002 | Bates et al. |
| 6,460,020 B1 | 10/2002 | Pool et al. |
| 6,466,917 B1 | 10/2002 | Goyal et al. |
| 6,484,149 B1 | 11/2002 | Jammes et al. |
| 6,489,968 B1 | 12/2002 | Ortega et al. |
| 6,522,955 B1 | 2/2003 | Colborn |
| 6,523,037 B1 | 2/2003 | Monahan et al. |

(56) References Cited

U.S. PATENT DOCUMENTS

| | | |
|---|---|---|
| 6,601,061 B1 | 7/2003 | Holt et al. |
| 6,604,107 B1 | 8/2003 | Wang |
| 6,625,764 B1 | 9/2003 | Dawson |
| 6,643,696 B2 | 11/2003 | Davis et al. |
| 6,661,431 B1 | 12/2003 | Stuart et al. |
| 6,665,838 B1 | 12/2003 | Brown et al. |
| 6,675,178 B1 | 1/2004 | Chinchar et al. |
| 6,694,436 B1 | 2/2004 | Audebert |
| 6,701,310 B1 | 3/2004 | Sugiura et al. |
| 6,718,536 B2 | 4/2004 | Dupaquis |
| 6,725,268 B1 | 4/2004 | Jacket et al. |
| 6,728,704 B2 | 4/2004 | Mao et al. |
| 6,732,161 B1 | 5/2004 | Hess et al. |
| 6,732,162 B1 | 5/2004 | Wood et al. |
| 6,785,689 B1 | 8/2004 | Daniel et al. |
| 6,801,909 B2 | 10/2004 | Delgado et al. |
| 6,856,963 B1 | 2/2005 | Hurwitz |
| 6,889,054 B2 | 5/2005 | Himmel et al. |
| 6,907,401 B1 | 6/2005 | Vittal et al. |
| 6,912,505 B2 | 6/2005 | Linden et al. |
| 6,925,307 B1 | 8/2005 | Mamdani et al. |
| 6,978,273 B1 | 12/2005 | Bonneau et al. |
| 7,043,450 B2 | 5/2006 | Velez et al. |
| 7,069,242 B1 | 6/2006 | Sheth et al. |
| 7,076,453 B2 | 7/2006 | Jammes et al. |
| 7,076,504 B1 | 7/2006 | Handel et al. |
| 7,080,030 B2 | 7/2006 | Eglen et al. |
| 7,099,891 B2 | 8/2006 | Harris et al. |
| 7,100,111 B2 | 8/2006 | McElfresh et al. |
| 7,100,195 B1 | 8/2006 | Underwood |
| 7,117,207 B1 | 10/2006 | Kerschberg et al. |
| 7,127,416 B1 | 10/2006 | Tenorio |
| 7,165,091 B2 | 1/2007 | Lunenfeld |
| 7,167,910 B2 | 1/2007 | Farnham et al. |
| 7,216,115 B1 | 5/2007 | Walters et al. |
| 7,240,016 B1 | 7/2007 | Sturgis et al. |
| 7,254,547 B1 | 8/2007 | Beck et al. |
| 7,305,614 B2 | 12/2007 | Chen et al. |
| 7,318,037 B2 | 1/2008 | Solari |
| 7,324,966 B2 | 1/2008 | Scheer |
| 7,340,249 B2 | 3/2008 | Moran et al. |
| 7,349,668 B2 | 3/2008 | Tan et al. |
| 7,353,188 B2 | 4/2008 | Yim et al. |
| 7,366,755 B1 | 4/2008 | Cuomo et al. |
| 7,379,890 B2 | 5/2008 | Myr et al. |
| 7,380,217 B2 | 5/2008 | Gvelesiani |
| 7,383,320 B1 | 6/2008 | Silberstein et al. |
| 7,401,025 B1 | 7/2008 | Lokitz |
| 7,447,646 B1 | 11/2008 | Agarwal et al. |
| 7,451,476 B1 | 11/2008 | Banks et al. |
| 7,454,464 B2 | 11/2008 | Puthenkulam et al. |
| 7,457,730 B2 | 11/2008 | Degnan |
| 7,493,521 B1 | 2/2009 | Li et al. |
| 7,496,525 B1 | 2/2009 | Mitchell |
| 7,496,527 B2 | 2/2009 | Silverstein et al. |
| 7,496,582 B2 | 2/2009 | Farnham et al. |
| 7,516,094 B2 | 4/2009 | Perkowski |
| 7,539,696 B1 | 5/2009 | Greener et al. |
| 7,546,625 B1 | 6/2009 | Kamangar |
| 7,552,067 B2 | 6/2009 | Nephew et al. |
| 7,565,615 B2 | 7/2009 | Ebert |
| 7,606,743 B2 | 10/2009 | Orzell et al. |
| 7,610,212 B2 | 10/2009 | Klett et al. |
| 7,653,573 B2 | 1/2010 | Hayes, Jr. et al. |
| 7,676,484 B2 | 3/2010 | Fagin |
| 7,834,883 B2 | 11/2010 | Adams |
| 7,904,348 B2 | 3/2011 | Johnson et al. |
| 7,904,349 B1 | 3/2011 | Hart et al. |
| 7,912,748 B1 | 3/2011 | Rosenberg et al. |
| 7,921,031 B2 | 4/2011 | Crysel et al. |
| 7,933,818 B1 | 4/2011 | Kumar et al. |
| 7,941,751 B2 | 5/2011 | Ebert |
| 7,979,340 B2 | 7/2011 | MacDonald Korth et al. |
| 7,983,950 B2 | 7/2011 | De Vita |
| 7,983,963 B2 | 7/2011 | Byrne et al. |
| 7,991,800 B2 | 8/2011 | Lawrence et al. |
| 8,086,643 B1 | 12/2011 | Tenorio |
| 8,095,523 B2 | 1/2012 | Brave et al. |
| 8,112,303 B2 | 2/2012 | Eglen et al. |
| 8,140,989 B2 | 3/2012 | Cohen et al. |
| 8,166,155 B1 | 4/2012 | Rachmeler et al. |
| 8,204,799 B1 | 6/2012 | Murray et al. |
| 8,214,264 B2 | 7/2012 | Kasavin et al. |
| 8,214,804 B2 | 7/2012 | Robertson |
| 8,260,852 B1 | 9/2012 | Cselle |
| 8,265,991 B1 | 9/2012 | Leffert |
| 8,312,056 B1 * | 11/2012 | Peng .................... G06Q 50/01 |
| | | 707/802 |
| 8,326,662 B1 | 12/2012 | Byrne et al. |
| 8,359,245 B1 | 1/2013 | Ballaro et al. |
| 8,370,269 B2 | 2/2013 | MacDonald-Korth et al. |
| 8,370,435 B1 | 2/2013 | Bonefas et al. |
| 8,386,493 B2 | 2/2013 | Muni et al. |
| 8,392,356 B2 | 3/2013 | Stoner et al. |
| 8,452,691 B2 | 5/2013 | MacDonald Korth et al. |
| 8,473,316 B1 | 6/2013 | Panzitta et al. |
| 8,494,912 B2 | 7/2013 | Fraser et al. |
| 8,498,906 B2 | 7/2013 | Zmolek |
| 8,545,265 B2 | 10/2013 | Sakamoto et al. |
| 8,566,170 B1 | 10/2013 | Joseph et al. |
| 8,577,740 B1 | 11/2013 | Murray et al. |
| 8,583,480 B2 | 11/2013 | Byrne |
| 8,584,149 B2 | 11/2013 | Crucs |
| 8,630,960 B2 | 1/2014 | Gross |
| 8,676,632 B1 | 3/2014 | Watson et al. |
| 8,693,494 B2 | 4/2014 | Fiatal |
| 8,719,075 B2 | 5/2014 | MacDonald Korth et al. |
| 8,793,650 B2 | 7/2014 | Hilerio et al. |
| 8,817,033 B2 | 8/2014 | Hur et al. |
| 9,047,341 B2 | 6/2015 | Pan |
| 9,047,642 B2 | 6/2015 | Byrne et al. |
| 9,123,069 B1 | 9/2015 | Haynes et al. |
| 9,201,558 B1 | 12/2015 | Dingman et al. |
| 9,292,361 B1 | 3/2016 | Chitilian et al. |
| 9,418,365 B2 | 8/2016 | Groarke et al. |
| 9,430,114 B1 | 8/2016 | Dingman et al. |
| 9,448,692 B1 | 9/2016 | Mierau et al. |
| 9,483,788 B2 | 11/2016 | Martin |
| 9,489,681 B2 | 11/2016 | Barous |
| 9,727,891 B2 | 8/2017 | Mezzacca |
| 9,741,080 B1 | 8/2017 | Byrne |
| 9,747,622 B1 | 8/2017 | Johnson et al. |
| 9,805,425 B2 | 10/2017 | MacDonald-Korth et al. |
| 9,928,752 B2 | 3/2018 | Byrne et al. |
| 9,940,659 B1 | 4/2018 | Behbahani et al. |
| 9,954,879 B1 | 4/2018 | Sadaghiani et al. |
| 10,013,500 B1 | 7/2018 | McClintock et al. |
| 10,074,118 B1 | 9/2018 | Johnson et al. |
| 10,102,287 B2 | 10/2018 | Martin |
| 10,210,518 B2 | 2/2019 | Alnajem |
| 10,217,147 B2 | 2/2019 | Shivaswamy et al. |
| 10,269,081 B1 | 4/2019 | Byrne |
| 10,423,997 B2 | 9/2019 | MacDonald-Korth et al. |
| 10,534,845 B2 | 1/2020 | Noursalehi et al. |
| 10,769,219 B1 | 9/2020 | Martin |
| 10,810,654 B1 | 10/2020 | Robertson et al. |
| 10,853,891 B2 | 12/2020 | MacDonald-Korth et al. |
| 10,872,350 B1 | 12/2020 | Hu et al. |
| 10,896,451 B1 | 1/2021 | Johnson et al. |
| 10,929,890 B2 | 2/2021 | Knab et al. |
| 10,949,876 B2 | 3/2021 | Johnson et al. |
| 10,970,463 B2 | 4/2021 | Noursalehi et al. |
| 10,970,742 B1 | 4/2021 | Knijnik et al. |
| 10,970,769 B2 | 4/2021 | Iqbal |
| 10,977,654 B2 | 4/2021 | Kumar et al. |
| 11,023,947 B1 | 6/2021 | Bosley et al. |
| 11,061,977 B1 | 7/2021 | Raskar |
| 11,062,316 B2 | 7/2021 | Bizarro et al. |
| 11,176,598 B2 | 11/2021 | D'Souza et al. |
| 11,205,179 B1 | 12/2021 | Patel et al. |
| 11,315,145 B1 | 4/2022 | Knijnik et al. |
| 11,463,578 B1 | 10/2022 | De Sanctis et al. |
| 11,475,484 B1 | 10/2022 | Knab et al. |
| 11,514,493 B1 | 11/2022 | Cook et al. |

(56) References Cited

U.S. PATENT DOCUMENTS

| | | |
|---|---|---|
| 11,526,653 B1 | 12/2022 | Noursalehi et al. |
| 11,593,811 B2 | 2/2023 | Hanis et al. |
| 11,631,124 B1 | 4/2023 | Robertson et al. |
| 11,676,192 B1 | 6/2023 | Moore et al. |
| 11,694,228 B1 | 7/2023 | Hu et al. |
| 11,734,368 B1 | 8/2023 | Campbell et al. |
| 2001/0002471 A1 | 5/2001 | Doish |
| 2001/0014868 A1 | 8/2001 | Herz et al. |
| 2001/0034667 A1 | 10/2001 | Petersen |
| 2001/0034668 A1 | 10/2001 | Whitworth |
| 2001/0044751 A1 | 11/2001 | Pugliese, III et al. |
| 2001/0047290 A1 | 11/2001 | Petras et al. |
| 2001/0047308 A1 | 11/2001 | Kaminsky et al. |
| 2001/0051996 A1 | 12/2001 | Cooper et al. |
| 2002/0002513 A1 | 1/2002 | Chiasson |
| 2002/0007321 A1 | 1/2002 | Burton |
| 2002/0007356 A1 | 1/2002 | Rice et al. |
| 2002/0013721 A1 | 1/2002 | Dabbiere et al. |
| 2002/0019763 A1 | 2/2002 | Linden et al. |
| 2002/0022995 A1 | 2/2002 | Miller et al. |
| 2002/0023059 A1 | 2/2002 | Bari et al. |
| 2002/0026390 A1 | 2/2002 | Ulenas et al. |
| 2002/0029187 A1 | 3/2002 | Meehan et al. |
| 2002/0038312 A1 | 3/2002 | Donner et al. |
| 2002/0040352 A1 | 4/2002 | McCormick |
| 2002/0042738 A1 | 4/2002 | Srinivasan et al. |
| 2002/0049622 A1 | 4/2002 | Lettich et al. |
| 2002/0056044 A1 | 5/2002 | Andersson |
| 2002/0065774 A1 | 5/2002 | Young et al. |
| 2002/0082932 A1 | 6/2002 | Chinnappan et al. |
| 2002/0099578 A1 | 7/2002 | Ficher, Jr. et al. |
| 2002/0099579 A1 | 7/2002 | Stowell et al. |
| 2002/0099602 A1 | 7/2002 | Moskowitz et al. |
| 2002/0107718 A1 | 8/2002 | Morrill et al. |
| 2002/0107853 A1 | 8/2002 | Hofmann et al. |
| 2002/0111826 A1 | 8/2002 | Potter et al. |
| 2002/0120537 A1 | 8/2002 | Morea et al. |
| 2002/0120609 A1 | 8/2002 | Lang et al. |
| 2002/0123957 A1 | 9/2002 | Notarius et al. |
| 2002/0124100 A1 | 9/2002 | Adams |
| 2002/0129282 A1 | 9/2002 | Hopkins |
| 2002/0133502 A1 | 9/2002 | Rosenthal et al. |
| 2002/0138399 A1 | 9/2002 | Hayes et al. |
| 2002/0147625 A1 | 10/2002 | Kolke, Jr. |
| 2002/0156802 A1 | 10/2002 | Takayama et al. |
| 2002/0161648 A1 | 10/2002 | Mason et al. |
| 2002/0161664 A1 | 10/2002 | Shaya et al. |
| 2002/0188777 A1 | 12/2002 | Kraft et al. |
| 2002/0194049 A1 | 12/2002 | Boyd |
| 2002/0194357 A1 | 12/2002 | Harris et al. |
| 2002/0198784 A1 | 12/2002 | Shaak et al. |
| 2002/0198882 A1 | 12/2002 | Linden et al. |
| 2003/0004855 A1 | 1/2003 | Dutta et al. |
| 2003/0005046 A1 | 1/2003 | Kavanagh et al. |
| 2003/0007464 A1 | 1/2003 | Balani |
| 2003/0009362 A1 | 1/2003 | Cifani et al. |
| 2003/0009392 A1 | 1/2003 | Perkowski |
| 2003/0014400 A1 | 1/2003 | Siegel |
| 2003/0028451 A1 | 2/2003 | Ananian |
| 2003/0028605 A1 | 2/2003 | Millett et al. |
| 2003/0032409 A1 | 2/2003 | Hutcheson et al. |
| 2003/0035138 A1 | 2/2003 | Schilling |
| 2003/0036914 A1 | 2/2003 | Fitzpatrick et al. |
| 2003/0040970 A1 | 2/2003 | Miller |
| 2003/0041008 A1 | 2/2003 | Grey et al. |
| 2003/0046149 A1 | 3/2003 | Wong |
| 2003/0069740 A1 | 4/2003 | Zeidman |
| 2003/0069790 A1 | 4/2003 | Kane |
| 2003/0069825 A1 | 4/2003 | Hoffman et al. |
| 2003/0083961 A1 | 5/2003 | Bezos et al. |
| 2003/0088467 A1 | 5/2003 | Culver |
| 2003/0088511 A1 | 5/2003 | Korboulonis et al. |
| 2003/0093331 A1 | 5/2003 | Childs et al. |
| 2003/0097352 A1 | 5/2003 | Gutta et al. |
| 2003/0105682 A1 | 6/2003 | Dicker et al. |
| 2003/0110100 A1 | 6/2003 | Wirth, Jr. |
| 2003/0119492 A1 | 6/2003 | Timmins et al. |
| 2003/0131095 A1 | 7/2003 | Kumhyr et al. |
| 2003/0139969 A1 | 7/2003 | Scroggie et al. |
| 2003/0140007 A1 | 7/2003 | Kramer et al. |
| 2003/0140121 A1 | 7/2003 | Adams |
| 2003/0158792 A1 | 8/2003 | Perkowski |
| 2003/0163340 A1 | 8/2003 | Fitzpatrick et al. |
| 2003/0167213 A1 | 9/2003 | Jammes et al. |
| 2003/0167222 A1 | 9/2003 | Mehrotra et al. |
| 2003/0177103 A1 | 9/2003 | Ivanov et al. |
| 2003/0187745 A1 | 10/2003 | Hobday et al. |
| 2003/0200156 A1 | 10/2003 | Roseman et al. |
| 2003/0204449 A1 | 10/2003 | Kotas et al. |
| 2003/0217002 A1 | 11/2003 | Enborg |
| 2003/0220835 A1 | 11/2003 | Barnes, Jr. |
| 2004/0006509 A1 | 1/2004 | Mannik et al. |
| 2004/0015416 A1 | 1/2004 | Foster et al. |
| 2004/0029567 A1 | 2/2004 | Timmins et al. |
| 2004/0041836 A1 | 3/2004 | Zaner et al. |
| 2004/0044563 A1 | 3/2004 | Stein |
| 2004/0055017 A1 | 3/2004 | Delpuch et al. |
| 2004/0058710 A1 | 3/2004 | Timmins et al. |
| 2004/0073476 A1 | 4/2004 | Donahue et al. |
| 2004/0078388 A1 | 4/2004 | Melman |
| 2004/0093311 A1 | 5/2004 | Chew et al. |
| 2004/0107136 A1 | 6/2004 | Nemirofsky et al. |
| 2004/0117242 A1 | 6/2004 | Conrad et al. |
| 2004/0122083 A1 | 6/2004 | Pettit et al. |
| 2004/0122681 A1 | 6/2004 | Ruvolo et al. |
| 2004/0122735 A1 | 6/2004 | Meshkin |
| 2004/0122855 A1 | 6/2004 | Ruvolo et al. |
| 2004/0128183 A1 | 7/2004 | Challey et al. |
| 2004/0128283 A1 | 7/2004 | Wang et al. |
| 2004/0128320 A1 | 7/2004 | Grove et al. |
| 2004/0143731 A1 | 7/2004 | Audebert et al. |
| 2004/0148232 A1 | 7/2004 | Fushimi et al. |
| 2004/0172323 A1 | 9/2004 | Stamm |
| 2004/0172379 A1 | 9/2004 | Mott et al. |
| 2004/0174979 A1 | 9/2004 | Hutton et al. |
| 2004/0186766 A1 | 9/2004 | Fellenstein et al. |
| 2004/0199496 A1 | 10/2004 | Liu et al. |
| 2004/0199905 A1 | 10/2004 | Fagin et al. |
| 2004/0204989 A1* | 10/2004 | Dicker ............... G06Q 30/0264 705/14.46 |
| 2004/0204991 A1 | 10/2004 | Monahan et al. |
| 2004/0230989 A1 | 11/2004 | Macey et al. |
| 2004/0240642 A1 | 12/2004 | Crandell et al. |
| 2004/0249727 A1 | 12/2004 | Cook Jr. et al. |
| 2004/0267717 A1 | 12/2004 | Slackman |
| 2005/0002166 A1 | 1/2005 | Dinnage et al. |
| 2005/0010925 A1 | 1/2005 | Khawand et al. |
| 2005/0038733 A1 | 2/2005 | Foster et al. |
| 2005/0044254 A1 | 2/2005 | Smith |
| 2005/0055306 A1 | 3/2005 | Miller et al. |
| 2005/0060664 A1 | 3/2005 | Rogers |
| 2005/0097204 A1 | 5/2005 | Horowitz et al. |
| 2005/0114229 A1 | 5/2005 | Ackley et al. |
| 2005/0120311 A1 | 6/2005 | Thrall |
| 2005/0131837 A1 | 6/2005 | Sanctis et al. |
| 2005/0144064 A1 | 6/2005 | Calabria et al. |
| 2005/0144074 A1 | 6/2005 | Fredregill et al. |
| 2005/0193333 A1 | 9/2005 | Ebert |
| 2005/0197846 A1 | 9/2005 | Pezaris et al. |
| 2005/0197950 A1 | 9/2005 | Moya et al. |
| 2005/0198031 A1 | 9/2005 | Pezaris et al. |
| 2005/0202390 A1 | 9/2005 | Allen et al. |
| 2005/0203888 A1 | 9/2005 | Woosley et al. |
| 2005/0216300 A1 | 9/2005 | Appelman et al. |
| 2005/0240474 A1 | 10/2005 | Li |
| 2005/0262067 A1 | 11/2005 | Lee et al. |
| 2005/0273378 A1 | 12/2005 | MacDonald-Korth et al. |
| 2005/0278231 A1 | 12/2005 | Teeter |
| 2006/0009994 A1 | 1/2006 | Hogg et al. |
| 2006/0010105 A1 | 1/2006 | Sarakkai et al. |
| 2006/0015498 A1 | 1/2006 | Sarmiento et al. |
| 2006/0031240 A1 | 2/2006 | Eyal et al. |
| 2006/0041638 A1 | 2/2006 | Whittaker et al. |
| 2006/0048093 A1 | 3/2006 | Jain et al. |

(56) References Cited

U.S. PATENT DOCUMENTS

| | | |
|---|---|---|
| 2006/0058048 A1 | 3/2006 | Kapoor et al. |
| 2006/0069623 A1 | 3/2006 | MacDonald Korth et al. |
| 2006/0085251 A1 | 4/2006 | Greene |
| 2006/0173817 A1 | 8/2006 | Chowdhury et al. |
| 2006/0206386 A1 | 9/2006 | Walker et al. |
| 2006/0206479 A1 | 9/2006 | Mason |
| 2006/0212358 A1 | 9/2006 | Walker et al. |
| 2006/0218049 A1 | 9/2006 | Walker et al. |
| 2006/0224470 A1 | 10/2006 | Garcia Ruano et al. |
| 2006/0230035 A1 | 10/2006 | Bailey et al. |
| 2006/0235752 A1 | 10/2006 | Kavanagh et al. |
| 2006/0253476 A1 | 11/2006 | Roth et al. |
| 2006/0259360 A1 | 11/2006 | Flinn et al. |
| 2006/0271671 A1 | 11/2006 | Hansen |
| 2006/0282304 A1 | 12/2006 | Bedard et al. |
| 2007/0005424 A1 | 1/2007 | Arauz |
| 2007/0027760 A1 | 2/2007 | Collins et al. |
| 2007/0027814 A1 | 2/2007 | Touriniemi |
| 2007/0055568 A1 | 3/2007 | Osborne |
| 2007/0073641 A1 | 3/2007 | Perry et al. |
| 2007/0077025 A1 | 4/2007 | Mino |
| 2007/0078726 A1 | 4/2007 | MacDonald Korth et al. |
| 2007/0078849 A1 | 4/2007 | Slothouber |
| 2007/0083437 A1 | 4/2007 | Hamor |
| 2007/0094597 A1 | 4/2007 | Rostom |
| 2007/0100803 A1 | 5/2007 | Cava |
| 2007/0130090 A1 | 6/2007 | Staib et al. |
| 2007/0160345 A1 | 7/2007 | Sakai et al. |
| 2007/0162379 A1 | 7/2007 | Skinner |
| 2007/0174108 A1 | 7/2007 | Monster |
| 2007/0192168 A1 | 8/2007 | Van Luchene |
| 2007/0192181 A1 | 8/2007 | Asdourian |
| 2007/0206606 A1 | 9/2007 | Coleman et al. |
| 2007/0214048 A1 | 9/2007 | Chan et al. |
| 2007/0226679 A1 | 9/2007 | Jayamohan et al. |
| 2007/0233565 A1 | 10/2007 | Herzog et al. |
| 2007/0239534 A1 | 10/2007 | Liu et al. |
| 2007/0245013 A1 | 10/2007 | Saraswathy et al. |
| 2007/0260520 A1 | 11/2007 | Jha et al. |
| 2007/0282666 A1 | 12/2007 | Afeyan et al. |
| 2007/0288298 A1* | 12/2007 | Gutierrez ............ G06Q 30/0201 705/7.29 |
| 2007/0299743 A1 | 12/2007 | Staib et al. |
| 2008/0010678 A1 | 1/2008 | Burdette et al. |
| 2008/0015938 A1 | 1/2008 | Haddad et al. |
| 2008/0021763 A1 | 1/2008 | Merchant |
| 2008/0052152 A1 | 2/2008 | Yufik |
| 2008/0071640 A1 | 3/2008 | Nguyen |
| 2008/0082394 A1 | 4/2008 | Floyd et al. |
| 2008/0103893 A1 | 5/2008 | Nagarajan et al. |
| 2008/0120342 A1 | 5/2008 | Reed et al. |
| 2008/0126205 A1 | 5/2008 | Evans et al. |
| 2008/0126476 A1 | 5/2008 | Nicholas et al. |
| 2008/0133305 A1 | 6/2008 | Yates et al. |
| 2008/0133349 A1 | 6/2008 | Nazer et al. |
| 2008/0140765 A1 | 6/2008 | Kelaita et al. |
| 2008/0162574 A1 | 7/2008 | Gilbert |
| 2008/0195476 A1 | 8/2008 | Marchese et al. |
| 2008/0201218 A1 | 8/2008 | Broder et al. |
| 2008/0215456 A1 | 9/2008 | West et al. |
| 2008/0281714 A1 | 11/2008 | Kluth |
| 2008/0288338 A1 | 11/2008 | Wiseman et al. |
| 2008/0294536 A1 | 11/2008 | Taylor et al. |
| 2008/0300909 A1 | 12/2008 | Rikhtverchik et al. |
| 2008/0301009 A1 | 12/2008 | Plaster et al. |
| 2008/0305869 A1 | 12/2008 | Konforty et al. |
| 2008/0313010 A1 | 12/2008 | Jepson et al. |
| 2008/0320012 A1 | 12/2008 | Loving et al. |
| 2009/0006190 A1 | 1/2009 | Lucash et al. |
| 2009/0006315 A1 | 1/2009 | Mukherjea et al. |
| 2009/0030755 A1 | 1/2009 | Altberg et al. |
| 2009/0030775 A1* | 1/2009 | Vieri ................ G06Q 30/00 705/14.54 |
| 2009/0037355 A1 | 2/2009 | Brave et al. |
| 2009/0106080 A1 | 4/2009 | Carrier et al. |
| 2009/0106127 A1 | 4/2009 | Purdy et al. |
| 2009/0110181 A1 | 4/2009 | Koenig et al. |
| 2009/0119167 A1 | 5/2009 | Kendall et al. |
| 2009/0157537 A1 | 6/2009 | Miller |
| 2009/0164323 A1 | 6/2009 | Byrne |
| 2009/0164442 A1 | 6/2009 | Shani et al. |
| 2009/0182589 A1 | 7/2009 | Kendall et al. |
| 2009/0204848 A1 | 8/2009 | Kube et al. |
| 2009/0222337 A1 | 9/2009 | Sergiades |
| 2009/0222348 A1 | 9/2009 | Ransom et al. |
| 2009/0222737 A1 | 9/2009 | Liesche et al. |
| 2009/0228918 A1 | 9/2009 | Rolff et al. |
| 2009/0234722 A1 | 9/2009 | Evevsky |
| 2009/0240582 A1 | 9/2009 | Sheldon-Neal et al. |
| 2009/0276284 A1 | 11/2009 | Yost |
| 2009/0276305 A1 | 11/2009 | Clopp |
| 2009/0292677 A1 | 11/2009 | Kim |
| 2009/0293019 A1 | 11/2009 | Raffel et al. |
| 2009/0313173 A1 | 12/2009 | Singh et al. |
| 2010/0042684 A1 | 2/2010 | Broms et al. |
| 2010/0070448 A1 | 3/2010 | Omoigui |
| 2010/0076816 A1 | 3/2010 | Phillips |
| 2010/0076851 A1 | 3/2010 | Jewell, Jr. |
| 2010/0094673 A1 | 4/2010 | Lobo et al. |
| 2010/0107123 A1 | 4/2010 | Sareen et al. |
| 2010/0145831 A1 | 6/2010 | Esfandiari et al. |
| 2010/0146413 A1 | 6/2010 | Yu |
| 2010/0174754 A1 | 7/2010 | B'Far et al. |
| 2010/0228617 A1 | 9/2010 | Ransom et al. |
| 2010/0274821 A1 | 10/2010 | Bernstein et al. |
| 2011/0010656 A1 | 1/2011 | Mokotov |
| 2011/0035276 A1 | 2/2011 | Ghosh et al. |
| 2011/0055054 A1 | 3/2011 | Glasson |
| 2011/0060621 A1 | 3/2011 | Weller et al. |
| 2011/0103699 A1 | 5/2011 | Ke et al. |
| 2011/0131253 A1 | 6/2011 | Peukert et al. |
| 2011/0137973 A1 | 6/2011 | Wei et al. |
| 2011/0145226 A1 | 6/2011 | Gollapudi et al. |
| 2011/0153383 A1 | 6/2011 | Bhattacharjya et al. |
| 2011/0153663 A1 | 6/2011 | Koren et al. |
| 2011/0173076 A1 | 7/2011 | Eggleston et al. |
| 2011/0191319 A1 | 8/2011 | Nie et al. |
| 2011/0196802 A1 | 8/2011 | Ellis et al. |
| 2011/0225050 A1 | 9/2011 | Varghese |
| 2011/0231226 A1 | 9/2011 | Golden |
| 2011/0231383 A1 | 9/2011 | Smyth et al. |
| 2011/0258049 A1 | 10/2011 | Ramer et al. |
| 2011/0271204 A1 | 11/2011 | Jones et al. |
| 2011/0276513 A1 | 11/2011 | Erhart et al. |
| 2011/0289068 A1 | 11/2011 | Teevan et al. |
| 2012/0005187 A1 | 1/2012 | Chavanne |
| 2012/0030067 A1 | 2/2012 | Pothukuchi et al. |
| 2012/0084135 A1 | 4/2012 | Nissan et al. |
| 2012/0089454 A1 | 4/2012 | Chen |
| 2012/0123899 A1 | 5/2012 | Wiesner |
| 2012/0158480 A1 | 6/2012 | Sundaram |
| 2012/0158715 A1 | 6/2012 | Maghoul et al. |
| 2012/0164619 A1 | 6/2012 | Meer |
| 2012/0166299 A1 | 6/2012 | Heinstein et al. |
| 2012/0203723 A1 | 8/2012 | Huang et al. |
| 2012/0231424 A1 | 9/2012 | Calman et al. |
| 2012/0233312 A1 | 9/2012 | Ramakumar et al. |
| 2012/0239504 A1 | 9/2012 | Curlander et al. |
| 2012/0253985 A1 | 10/2012 | Maron et al. |
| 2012/0271702 A1 | 10/2012 | MacLachlan et al. |
| 2012/0278388 A1 | 11/2012 | Kleinbart et al. |
| 2012/0284336 A1 | 11/2012 | Schmidt et al. |
| 2012/0296697 A1 | 11/2012 | Kumar |
| 2012/0323674 A1 | 12/2012 | Simmons et al. |
| 2012/0323725 A1 | 12/2012 | Johnston et al. |
| 2013/0031470 A1 | 1/2013 | Daly, Jr. et al. |
| 2013/0073392 A1 | 3/2013 | Allen et al. |
| 2013/0080200 A1 | 3/2013 | Connolly et al. |
| 2013/0080426 A1 | 3/2013 | Chen et al. |
| 2013/0085893 A1 | 4/2013 | Bhardwaj et al. |
| 2013/0144870 A1 | 6/2013 | Gupta et al. |
| 2013/0145254 A1 | 6/2013 | Masuko et al. |
| 2013/0151331 A1 | 6/2013 | Avner et al. |
| 2013/0151388 A1 | 6/2013 | Falkenborg et al. |

(56) References Cited

U.S. PATENT DOCUMENTS

| | | |
|---|---|---|
| 2013/0173408 A1 | 7/2013 | Lindblom |
| 2013/0185164 A1 | 7/2013 | Pottjegort |
| 2013/0191409 A1 | 7/2013 | Zeng et al. |
| 2013/0246300 A1 | 9/2013 | Fischer et al. |
| 2013/0254059 A1 | 9/2013 | Teo |
| 2013/0268561 A1 | 10/2013 | Christie et al. |
| 2014/0019298 A1 | 1/2014 | Suchet et al. |
| 2014/0019313 A1 | 1/2014 | Hu et al. |
| 2014/0019542 A1 | 1/2014 | Rao et al. |
| 2014/0025509 A1 | 1/2014 | Reisz et al. |
| 2014/0032544 A1 | 1/2014 | Mathieu et al. |
| 2014/0095273 A1 | 4/2014 | Tang et al. |
| 2014/0114680 A1 | 4/2014 | Mills et al. |
| 2014/0114755 A1 | 4/2014 | Mezzacca |
| 2014/0136290 A1 | 5/2014 | Schiestl et al. |
| 2014/0172652 A1 | 6/2014 | Pobbathi et al. |
| 2014/0180758 A1 | 6/2014 | Agarwal et al. |
| 2014/0200959 A1 | 7/2014 | Sarb et al. |
| 2014/0259056 A1 | 9/2014 | Grusd |
| 2014/0278880 A1 | 9/2014 | Emphers et al. |
| 2014/0279191 A1 | 9/2014 | Agarwal et al. |
| 2014/0289005 A1 | 9/2014 | Laing et al. |
| 2014/0310094 A1 | 10/2014 | Shapira et al. |
| 2014/0330818 A1 | 11/2014 | Raina et al. |
| 2014/0337090 A1 | 11/2014 | Tavares |
| 2014/0372415 A1 | 12/2014 | Fernandez-Ruis |
| 2015/0019958 A1 | 1/2015 | Ying et al. |
| 2015/0032507 A1 | 1/2015 | Narasimhan et al. |
| 2015/0088695 A1 | 3/2015 | Lorbiecki et al. |
| 2015/0088968 A1 | 3/2015 | Wei et al. |
| 2015/0089524 A1 | 3/2015 | Cremonesi et al. |
| 2015/0106181 A1 | 4/2015 | Kluth |
| 2015/0142543 A1 | 5/2015 | Lellouche |
| 2015/0286742 A1 | 10/2015 | Zhang et al. |
| 2015/0287066 A1 | 10/2015 | Wortley et al. |
| 2016/0071105 A1 | 3/2016 | Groarke et al. |
| 2016/0098488 A1 | 4/2016 | Battle et al. |
| 2017/0076324 A1 | 3/2017 | Waldron |
| 2017/0228375 A1 | 8/2017 | Yang et al. |
| 2017/0235788 A1 | 8/2017 | Borisyuk et al. |
| 2017/0300911 A1 | 10/2017 | Alnajem |
| 2017/0344622 A1 | 11/2017 | Islam et al. |
| 2017/0358000 A1 | 12/2017 | Jain et al. |
| 2018/0033064 A1 | 2/2018 | Varley |
| 2018/0167412 A1 | 6/2018 | Barrett et al. |
| 2019/0043106 A1 | 2/2019 | Talmor et al. |
| 2019/0066111 A1 | 2/2019 | Bizarro et al. |
| 2019/0130904 A1 | 5/2019 | Homma et al. |
| 2019/0197550 A1 | 6/2019 | Sharma |
| 2019/0295088 A1 | 9/2019 | Jia et al. |
| 2019/0325868 A1 | 10/2019 | Lecue et al. |
| 2020/0005310 A1 | 1/2020 | Kumar et al. |
| 2020/0065357 A1 | 2/2020 | Noursalehi et al. |
| 2020/0184540 A1 | 6/2020 | D'Souza et al. |
| 2020/0218766 A1 | 7/2020 | Yaseen et al. |
| 2020/0250675 A1 | 8/2020 | Hanis et al. |
| 2020/0293587 A1 | 9/2020 | Ayers et al. |
| 2020/0410552 A1 | 12/2020 | Stohlman |

FOREIGN PATENT DOCUMENTS

| | | |
|---|---|---|
| EP | 0636993 | 4/1999 |
| EP | 0807891 | 5/2000 |
| EP | 1241603 | 9/2002 |
| GB | 2397400 | 7/2004 |
| GB | 2424098 | 9/2006 |
| JP | 2001283083 | 12/2001 |
| JP | 2002318935 | 10/2002 |
| JP | 2007021920 | 2/2007 |
| JP | 2009505238 | 2/2009 |
| WO | WO1997017663 | 5/1997 |
| WO | WO1998032289 | 7/1998 |
| WO | WO1998047082 | 10/1998 |
| WO | WO1998049641 | 11/1998 |
| WO | WO1999059283 | 11/1999 |
| WO | WO2000025218 | 5/2000 |
| WO | WO20000068851 | 11/2000 |
| WO | WO2001009803 | 2/2001 |
| WO | WO2001082135 | 11/2001 |
| WO | WO2001097099 | 12/2001 |
| WO | WO2002037234 | 5/2002 |
| WO | WO2003094080 | 11/2003 |
| WO | WO2007021920 | 2/2007 |
| WO | WO2012093410 | 7/2012 |
| WO | WO2015116038 | 8/2015 |
| WO | WO2015176071 | 11/2015 |

OTHER PUBLICATIONS

Tjostheim et al., "A case study of an on-line auction for the World Wide Web," printed from www.nr.no/gem/elcom/puplikasjoner/enter98e.html on Jun. 10, 1990, 10 pages.

Turban, "Auctions and Bidding on the Internet: An Assessment," Electronic Markets—The International Journal, Dec. 1997, 5 pages, vol. 7, No. 4.

ubid.com, "How do I Updated my Address, Phone, Credit Card, Password, etc.?" printed from web.archive.org/web/20010208113903/www.ubid.com/help/topic13asp on Aug. 30, 2007.

ubid.com, "How do I track my shipment?" printed from web.archive.org/web/20010331032659/www.ubid.com/help/topic27.asp on Aug. 30, 2007.

ubid.com, "Can I track all of my bids from My Page?" printed from web.archive.org/web/20010208114049/www.ubid.com/help/topic14.asp on Aug. 30, 2007.

Van Heck et al., "Experiences with Electronic Auctions in the Dutch Flower Industry," Electronic Markets—The International Journal, Dec. 1997, 6 pages, vol. 7, No. 4.

Verizon Wireless, "Verizon Wireless Customers Get It NowSM; Get Games, Get Pix, Get Ring Tones and Get Going in Full Color," press release to PRNEWSWIRE, Sep. 23, 2002.

Warbelow et al., "AUCNET: TV Auction Network System," Harvard Business School 9-190-001, Jul. 19, 1989, Rev. Apr. 12, 1996, pp. 1-15.

Weber, "How Financial Markets are Going On-line," Electronic Markets—The International Journal, Oct. 1993, 2 pages, vol. 3, No. 3.

Wireless Internet, "DailyShopper Selects 2Roam to Enable Mobile Customers to Retrieve Nearby Sales and Promotions Information," Wireless Internet, Apr. 2001.

Wireless Week, "Verizon Wireless Gets Going on BREW Agenda," Wireless Week, Sep. 23, 2002.

xchanger.net, webpage printed from www.auctiva.com/showcases/as_4sale.asp?uid=exchanger, undated but at least as early as Oct. 12, 2000.

Yu et al., "Distributed Reputation Management for Electronic Commerce," Computational Intelligence, 2002, pp. 535-549, vol. 18, No. 4.

Zetmeir, Auction Incentive Marketing, print of all pages of website found at home.earthlink.net/~bidpointz/ made Oct. 8, 2004.

Zimmermann, "Integration of Financial Services: The TeleCounter," Electronic Markets—The International Journal, Oct. 1993, 1 page, vol. 3, No. 3.

Zwass, "Electronic Commerce: Structures and Issues," International Journal of Electronic Commerce, Fall 1996, pp. 3-23, vol. 1, No. 1.

MESSAGE Passing from Wikipedia, archived May 6, 2016, retrieved from https://en.wikipedia.org/wiki/message_passing, 4 pages.

Di et al., "A New Implementation for Ontology Mapping Based enterprise Semantic Interoperation," by Xiaofeng Di and Yushun Fan, Applied Mechanics and Materials, vols. 16-19 (2009), pp. 644-648 (Year:2009).

Nicolle et a., "XML Integration and Toolkit for B2B Applications," by Christophe Nicolle, Kokou Yetongnon, and Jean-Claude Simon, Journal of Database Management, Oct.-Dec. 2003 (Year: 2003).

V. Aksakalli, Optimizing direct response in Internet display advertising, Elsevier, vol. 11, Issue 3, May-Jun. 2012, pp. 229-240. (Year: 2012).

Gallagher et al. A framework for targeting banner advertising on the internet. IEEE, pp. 265-274 (Year: 1997).

(56) References Cited

OTHER PUBLICATIONS

Alex, Neil, "Optimizing Search Results in Elasticsearch with Scoring and Boosting", Mar. 18, 2015, Qbox.io, accessed at [https://qbox.io/blog/optimizing-search-results-in-elasticsearch0with-scoring-and-boosting] (year: 2015).
Hybrid algorithms for recommending new items. Cremonesi et al., ResearchGate, Google, (year:2011).
Lee, "AUCNET: Electronic Intermediary for Used-Car Transactions," Electronic Market—The International Journal, Dec. 1997, pp. 24-28, vol. 7, No. 4.
T.Y. Lee, S. Li and R. Wei, "Needs-Centric Searching and Ranking Based on Customer Reviews," 2008 10th IEEE Conference on E-Commerce Technology and the Fifth IEEE Conference on Enterprise Computing, E-Commerce and E-Services, Washington, DC, 2008, pp. 128-135. (Year: 2008).
Levy, Michael, and Dhruv Grewal. "Supply chain management in a networked economy." Journal Retailing 76.4 (2000): 415-429.
Live365 press release, "Live365 to Offer Opt-In Advertising on Its Website," Oct. 15, 2004.
London Business School, "Overture and Google: Internet Pay-Per-Click (PPC) Advertising Options," Mar. 2003.
M2 Presswire, "Palm, Inc.: Palm unveils new web browser optimised for handhelds; HTML browser offers high-speed web-browsing option," Mar. 13, 2002.
Malone et al., "Electronic Markets and Electronic Hierarchies," Communications of the ACM, Jun. 1987, pp. 484-497, vol. 30, No. 6.
Mansell et al., "Electronic Trading Networks: The Route to Competitive Advantage?" Electronic Markets—The International Journal, Oct. 1993, 1 page, vol. 3, No. 3.
Mardesich, "Onsale takes auction gavel electronic," Computer Reseller News, Jul. 8, 1996, pp. 2, 32.
Marteau, "Shop with One Click, Anywhere, Anytime," Information Management and Consulting, 2000, pp. 44-46, vol. 15, No. 4.
Massimb et al., "Electronic Trading, Market Structure and Liquidity," Financial Analysts Journal, Jan.-Feb. 1994, pp. 39-49.
McGinnity, "Build Your Weapon," PC Magazine, Apr. 24, 2011, printed from www.pcmag.com/print_article2?0,1217,a%253D3955,00.asp.
Meade, "Visual 360: a performance appraisal system that's 'fun,'" HR Magazine, 44, 7, 118(3), Jul. 1999.
"Mediappraise: Mediappraise Receives National Award for Web-Based Technology That Enables Companies to Solve Thorny HR Problem," Dec. 14, 1998.
Medvinsky et al., "Electronic Currency for the Internet," Electronic Markets—The International Journal, Oct. 1993, 2 pages, vol. 3, No. 3.
metails.com, www.metails.com homepage, printed Oct. 13, 2004.
Microsoft Computer Dictionary, Fifth Edition, front matter and p. 33.
Microsoft Computer Dictionary, Fifth Edition, front matter, back matter, and pp. 479, 486.
Neches, "FAST—A Research Project in Electronic Commerce," Electronic Markets—The International Journal, Oct. 1993, 4 pages, vol. 3., No. 3.
Neisser, "Which is better for Social Media Monitoring: TweetDeck or SproutSocial" Mar. 17, 2011, Social Media Examiner, https://www.socialmediaexaminer.com/which-is-better-for-social-media-monitoring-tweetdeck-or-sproutsocial/.
Neo, "The implementation of an electronic market for pig trading in Singapore," Journal of Strategic Information Systems, Dec. 1992, pp. 278-288, vol. 1, No. 5.
O'Mahony, "An X.500-based Product Catalogue," Electronic Markets—The International Journal, Oct. 1993, 2 pages, vol. 3, No. 3.
"ONSALE: ONSALE Brings Thrill of Auctions and Bargain Hunting Online: Unique Internet retail services debuts with week-long charity auction for the Computer Museum in Boston," May 24, 1995, printed from www.dialogweb.com/cgi/dwclient?dwcommand,DWEBPRINT%20810-489267.

"ONSALE joins fray as online shopping pcks up speed: Internet Booms," Comptuer Reseller News, Jun. 5, 1995.
Palm, Inc., PalmTM Web Pro Handbook, copyright 2002-2003.
Post et al., "Application of Auctions as a Pricing Mechanism for the Interchange of Electric Power," IEEE Transactions of Power Systems, Aug. 1995, pp. 1580-1584, vol. 10, No. 3.
Preist et al., "Adaptive agents in a persistent shout double auction," International Conference on Information and Computation, Proceedings of the first international conference on information and computation economies, Oct. 25-28, 1998, Charleston, United States, pp. 11-18.
Qualcomm, "Brew Developer Support," printed from web.archive.org/web/20020209194207/http://www.qualcomm.com/brew/developer/support/kb/52.html on Aug. 30, 2007.
RCR Wireless News, "Lockheed Martin to use 2Roam's technology for wireless platform," RCR Wireless News, Sep. 10, 2001.
Reck, "Formally Specifying an Automated Trade Execution System," J. Systems Software, 1993, pp. 245-252, vol. 21.
Reck, "Trading-Process Characteristics of Electronic Auctions," Electronic Markets—The International Journal, Dec. 1997, pp. 17-23, vol. 7, No. 4.
repcheck.com, www.repcheck.com homepage, printed from web.archive.org/web/20020330183132/http://repcheck.com on Sep. 5, 2009.
Resnick et al., "Reputation Systems," Communications of the ACM, Dec. 2000, pp. 45-48, vol. 43, No. 12.
Rockoff et al., "Design of an Internet-based system for remote Dutch auctions," Internet Research: Electronic Networking Applications and Policy, 1995, pp. 10-16, vol. 5, No. 4.
Rodriguez, Camille, HootSuite vs. social Oomph vs. Tweekdeck, Jan. 4, 2012, http://polkadotimpressions.com/2012/01/04/hootsuite-vs-social-oopmphvs.tweetdeck/ (Year: 2012).
Rose, "Vendors strive to undo Adobe lock-hold," Computer Reseller News, Feb. 5, 1996, n 66669, p. 71(7).
Ross, David Frederick, Frederick S. Weston, and W. Stephen. Introduction to supply chain management technologies. CRC Press, 2010.
Rysavy, "Mobile-commerce ASPs do the legwork," Network Computing, Jan. 22, 2001, p. 71, 6 pgs., vol. 12, No. 2.
Saunders, "AdFlight to Offer WAP Ads," Oct. 17, 2000, printed from clickz.com/487531/print.
Schaffer, Neil, The Top 20 Twitter clients—HootSuite, TweetDeck and More, Jan. 31, 2012, https://maximizesocialbusinss.com/top-20-twitter-clients-2012-9175/ (Year: 2012).
Schmid, "Electronic Markets," Electronic Markets—The International Journal, Oct. 1993, 2 pages, vol. 3, No. 3.
Schwankert, "Matsushita Taps 2Roam for Wireless Solutions," www.internetnews.com/bus-news.article.php/674811, Feb. 2, 2001.
Sen, "Inventory and Pricing Models for Perishable Products," Doctor of Philosophy Dissertation—University of Southern California, Aug. 2000.
Siegmann, "Nowhere to go but up," PC Week, Oct. 23, 1995, 3 pages, vol. 12, No. 42.
Telephony Staff, "Air-ASP," Telephony Online, Oct. 2, 2000, 3 pages.
2Roam, Inc., multiple archived pages of www.2roam.com retrieved via Internet Archive Wayback Machine on Jun. 10, 2008.
Alt et al., "Bibliography on Electronic Commerce," Electronic Markets—The International Journal, Oct. 1993, 5 pages, vol. 3, No. 3.
Alt et al., "Computer Integrated Logistics," Electronic Markets—The International Journal, Oct. 1993, 1 page, vol. 1, No. 3.
Anonymous, Image manipulation (image editing software and image-manipulation systems)(Seybold Special Report, Part II), Seybold Report on Publishing Systems, May 15, 1995, p. S35(9), vol. 24, No. 18.
auctionwatch.com, multiple pages—including search results for "expedition," printed Apr. 21, 2011.
auctiva.com, multiple pages, undated but website copyright date is "1999-2000."
Ball et al., "Supply chain infrastructures: system integration and information sharing," ACM SIGMOD Record, 2002, vol. 31, No. 1, pp. 61-66.

(56) References Cited

OTHER PUBLICATIONS

Berger et al., "Random Ultiple-Access Communication and Group Testing," IEEE, 1984.
Braganza, "Is Resarch at Cranfield—A Look at the Future," Electronic Markets—The International Journal, Oct. 1993, 1 page, vol. 3, No. 3.
Brecht et al., "The IM 2000 Research Programme," Electronic Markets—The International Journal, Oct. 1993, 1 page, vol. 3, No. 3.
Business Wire business/technology editors, "Sellers Flock to OutletZoo.com as New Automatic Price Drop Method Moves Excess Inventory Online," Business Wire, Oct. 25, 1999.
Business Wire business editors/high-tech writers, "PictureWorks Technology, Inc. Expands in Real Estate Market with Adoption of Rimfire on REALTOR.com," Business Wire, Nov. 8, 1999.
Business Wire business editors/high-tech writers, "PictureWorks Technology, Inc. Shows Strong Revenue Growth in Internet Imaging Business," Business Wire, Nov. 10, 1999.
Business Wire business editors/high-tech writers, "2Roam Partners with Pumatech to Delivery Wireless Alerts," Business Wire, Dec. 18, 2000.
Business Wire business editors/high-tech writers, "2Roam Takes eHow's How-to Solutions Wireless: With 2Roam, the Web's One-Stop Source for getting Things Done is on More Wireless Devices, with Ability to Purchase Its Products from Anywhere," Business Wire, Oct. 2, 2000.
Business Wire business editors/high-tech writers, "2Roam Drives Hertz to the Wireless Web: No. One Car Rental Company to Provide Customers Wireless Access from Any Device, " Business Wire, Aug. 7, 2001.
buy.com, www.buy.com homepage, printed Oct. 13, 2004.
Chen et al., "Detecting Web Page Structure for Adaptive Viewing on Small Form Factor Devices," ACM, May 20-24, 2003.
Chen, M. (2007). Knowledge assisted data management and retrieval in multimedia database systems (Order No. 3268643).
Y.K. Choi and S. K. Kim, "An auxillary reccomendation system for repetitively purchasing items in E-commerce," 2014 International Conference on Big Data and Smart Computing (BIGCOMP), Bangkok, 2014, pp. 96-98. (Year 2014).
Clarke, "Research Programme in Supra-organizational Systems," Electronic Markets—The International Journal, Oct. 1993, 2 pages, vol. 3, No. 3.
Clemons et al., "Evaluating the prospects for alternative electronic securities markets," Proceedings of the twelfth International conference on information systems, New York, New York, United States, pp. 53-64, 1991.
Fan, J., Keim, F.A., Gao, Y., Luo, H. and Li, Z. (2009). JustClick: Personalized Image Recommendation via Exploratory Search from Large-Scale Flickr Images. Feb. 2009. IEEE Transactions on Circuits and Systems for Video Technology, 19(2), pp. 2730288. (Year: 2009).
friendster.com, homepage and "more info" pages, printed Apr. 29, 2004.
Google News archive search for "2Roam marketing" performed over the date range 2000-2003.
Google News archive search for "2Roam SMS" performed over the date range 2000-2008.
Grabowski et al., "Mobile-enabled grid middleware and/or grid gateways," GridLab—A Grid Application Toolkit and Testbed, Work Package 12—Access for Mobile Users, Jun. 3, 2003.
Graham, "The Emergence of Linked Fish Markets in Europe," Electronic Markets—The International Journal, Jul. 1993, 4 pages, vol. 8, No. 2.
Gunthorpe et al., "Portfolio Composition and the Investment Horizon," Financial Analysts Journal, Jan.-Feb. 1994, pp. 51-56.
Halperin, "Toward a Process Handbook for Organizational Coordination Processes," Electronic Markets—The International Journal, Oct. 1993, 1 page, vol. 3, No. 3.
Hess et al., "Computerized Loan Origination Systems: An Industry Case Study of the Electronic Markets Hypothesis," MIS Quarterly, Sep. 1994, pp. 251-275.
IBM, "Anyonymous Delivery of Goods in Electronic Commerce," IBM Technical Disclosure Bulletin, Mar. 1996, pp. 363-366, vol. 39, No. 3.
IBM, "Personal Optimized Decision/Transaction Program," IBM Technical Disclosure Bulletin, Jan. 1995, pp. 83-84, vol. 38, No. 1.
ICROSSING, "ICROSSING Search Synergy: Natural & Paid Search Symbiosis," Mar. 2007.
IEEE 100—The Authoritative Dictionary of IEEE Standard Terms, Seventh Edition, 2000. Entire book cited; table of contents, source list, and terms beginning with A included. ISBN 0-7381-2601-2a.
Ives et al., "Editor's Comments—MISQ Central: Creating a New Intellectual Infrastructure," MIS Quarterly, Sep. 1994, p. xxxv.
Joshi, "Information visibility and its effect on supply chain dynamics," Ph.D. dissertation, Massachusetts Institute of Technology, 2000 (fig. 4.5; p. 45).
Klein, "Information Logistics," Electronic Markets—The International Journal, Oct. 1993, pp. 11-12, vol. 3, No. 3.
Klein, "Introduction to Electronic Auctions," Electronic Markets—The International Journal, Dec. 1997, 4 pages, vol. 7, No. 4.
Kubicek, "The Organization Gap," Electronic Markets—The International Journal, Oct. 1993, 1 page, vol. 3, No. 3.
S. Kulkarni, A. M. Sankpal, R.R. Mudholkar and Kirankumari, "Recommendation engine: Matching individual/group profiles for better shopping experience," 2013 15th International Conference on Advanced Computing Technologies (ICACT), Rajampet, 2013, pp. 1-6. (Year: 2013).
Kuula, "Telematic Services in Finland," Electronic Markets—The International Journal, Oct. 1993, 1 page, vol. 3, No. 3.
Lalonde, "The EDI World Institute: An International Approach," Electronic Markets—The International Journal, Oct. 1993, 1 page, vol. 3, No. 3.
Lee et al., "Intelligent Electronic Trading for Commodity Exchanges," Electronic Markets—The International Journal, Oct. 1993, 2 pages, vol. 3, No. 3.
Lee et al., "Electronic Brokerage and Electronic Auction: The Impact of IT on Market Structures," Proceedings of the 29th Annual Hawaii International Conference on System Sciences, 1996, pp. 397-406.
Dubinsky, B., "Uncovering accounts payable fraud by using 'fuzzy matching logic': Part 1," Business Credit 110.3:6 (4), National Association of Credit Management, Mar. 2008, (Year: 2008).
Dubinsky, B., "Uncovering accounts payable fraud by using 'fuzzy matching logic': Part 2," Business Credit 110.4: 64 (3), National Association of Credit Management, Apr. 2008 (Year:2008).
Qureshi et al. "Taxonomy based Data Marts," by Asiya Abdus Salam Qureshi and Syed Muhammad Khalid Jamal, International Journal of Computer Applications (0975-8887), vol. 60, No. 13, Dec. 2012 (Year: 2012).
Haibin Liu, Vlado Keselj, "Combined mining of Web server logs and web contents for classifying user navigation patterns and predicting users' future requests," Data & Knowledge Engineering, vol. 61, Issue 2, 2007, pp. 304-330 (Year: 2007).
Sumathi et al., "Automatic Recommendation of Web Pages in Web Usage Mining," International Journal on Computer Science and Engineering, vol. 02, No. 09, 2010 (Year: 2010).
Harrington, Caitlin "The Future of Shopping" Wired 26. 12:30. Conde Nast Publications Inc. (Dec. 2018).
Craver, Thom, Inside Bing's Spell Checker, Jan. 4, 2013, searchenginewatch.com, accessed at [https://www.searchenginewatch.com/2013/01/04/inside-beings-spell-checker/] (Year: 2013).
Business Wire [New York] "Data Warehousing Leader Acta Inc. Extends Award-Winning Technology to E-Commerce" Sep. 14, 1999 (Year: 1999).
Gong et al., IEEE Computer Society 3pgs. (Year: 2008) "A collaborative Recommender Combining Item Rating Similarity and Item Attribute Similarity".

* cited by examiner

SYSTEM AND METHOD FOR MANAGEMENT OF EMAIL MARKETING CAMPAIGNS

CROSS-REFERENCE TO RELATED APPLICATIONS

This application is a continuation of U.S. application Ser. No. 13/663,353, filed Oct. 29, 2012, now U.S. Pat. No. 10,949,876, which is hereby incorporated by reference in its entirety.

STATEMENT REGARDING FEDERALLY SPONSORED RESEARCH OR DEVELOPMENT

Not Applicable.

BACKGROUND

1. The Field of the Present Disclosure

The present disclosure relates generally to communication networks and e-commerce, and more particularly, but not necessarily entirely, to systems, programs, and methods of managing online advertising campaigns for e-commerce enterprises.

2. Description of Related Art

Electronic commerce, commonly known as "e-commerce," involves the buying and selling of products or services using electronic systems, such as the Internet and other computer networks. E-commerce has grown to include electronic transactions conducted over smart phones and other emerging technologies. In a typical transaction, a consumer, sometimes referred to herein as a "user," accesses an e-commerce website of an e-commerce enterprise from a user access device. The user may search the e-commerce website for desired products or services using a local search engine. In addition, the user may search the e-commerce website for desired products through a product hierarchy. Using an established checkout procedure, the user is able to purchase the desired product or service from the e-commerce website as is known to those having skill in the art.

Operators of e-commerce enterprises track data regarding their users. In some instances, an e-commerce enterprise may gather demographic data about its users as well as purchasing habits and other information. Operators of e-commerce enterprises often engage in active marketing campaigns to drive traffic to their e-commerce websites. These marketing campaigns may involve targeting previous users based on the data collected for the users. One type of marketing campaign involves sending targeted electronic communications, such as emails or text messages, to users. The communications typically include advertisements, such as product promotions and other advertisements, within the body of the message. The body of the message typically includes a link to an e-commerce webpage such that users can quickly review further information about the products or make product purchases.

As mentioned, marketing campaigns may be specifically targeted to users. To implement a targeted marketing campaign, e-commerce enterprises may track and store user information in a data warehouse. For example, the user information may include demographic information about the users visiting an e-commerce website, such as e-mail addresses, cell phone numbers, gender, age, education, interests, hobbies, etc. In addition, the user information may include user history information regarding a user's interaction with an e-commerce website, such as information regarding prior purchases, items viewed, items placed into a virtual shopping cart but removed prior to purchase, etc.

The user information tracked and stored by an e-commerce website is commonly utilized to generate targeted online advertising campaigns. That is, an e-commerce enterprise may generate an online advertising campaign that targets users who may be interested in a specific product or service as determined from their stored user information.

As will be understood by those having ordinary skill in the relevant art, generating an online electronic advertising campaign is a time-intensive process for large e-commerce enterprises. For example, the marketing department of the e-commerce enterprise selects the product or service to be advertised and creates an electronic template of the promotion. Next, the marketing department identifies the profile of the targeted users, i.e., a target profile. Once the target profile is identified, a query of a data warehouse is performed to identify users matching the target profile and generate a list of targeted users. Next, a customized electronic communication for each user is generated from the template using a computer. If the number of targeted users is large, this step may take several hours or even days. Lastly, the electronic communication is sent to each of the targeted users. Again, the above process can take several hours or days depending on the size of the campaign.

One drawback to the widespread use of electronic marketing campaigns is that of user fatigue. User fatigue occurs when users receive multiple electronic communications from an e-commerce enterprise within a short time frame. When user fatigue occurs, campaigns become less effective and may even cause users to opt out of future campaigns. In particular, users' in-boxes are often bombarded with advertisements from e-commerce enterprises. For example, in some instances, users may receive several emails a day from the same e-commerce enterprise. This typically occurs when a user's profile matches the target profile of several concurrent running marketing campaigns implemented by an e-commerce enterprise. In the past, there have been ineffective tools for coordinating between two or more concurrent marketing campaigns to prevent users from receiving multiple communications within a given time period.

The prior art is thus characterized by several disadvantages that are addressed by the present disclosure. The present disclosure minimizes, and in some aspects eliminates, the above-mentioned failures, and other problems, by utilizing the methods and structural features described herein.

The features and advantages of the present disclosure will be set forth in the description that follows, and in part will be apparent from the description, or may be learned by the practice of the present disclosure without undue experimentation. The features and advantages of the present disclosure may be realized and obtained by means of the instruments and combinations particularly pointed out in the appended claims.

BRIEF DESCRIPTION OF THE DRAWINGS

The features and advantages of the disclosure will become apparent from a consideration of the subsequent detailed description presented in connection with the accompanying drawings in which.

DETAILED DESCRIPTION

Figure 1:
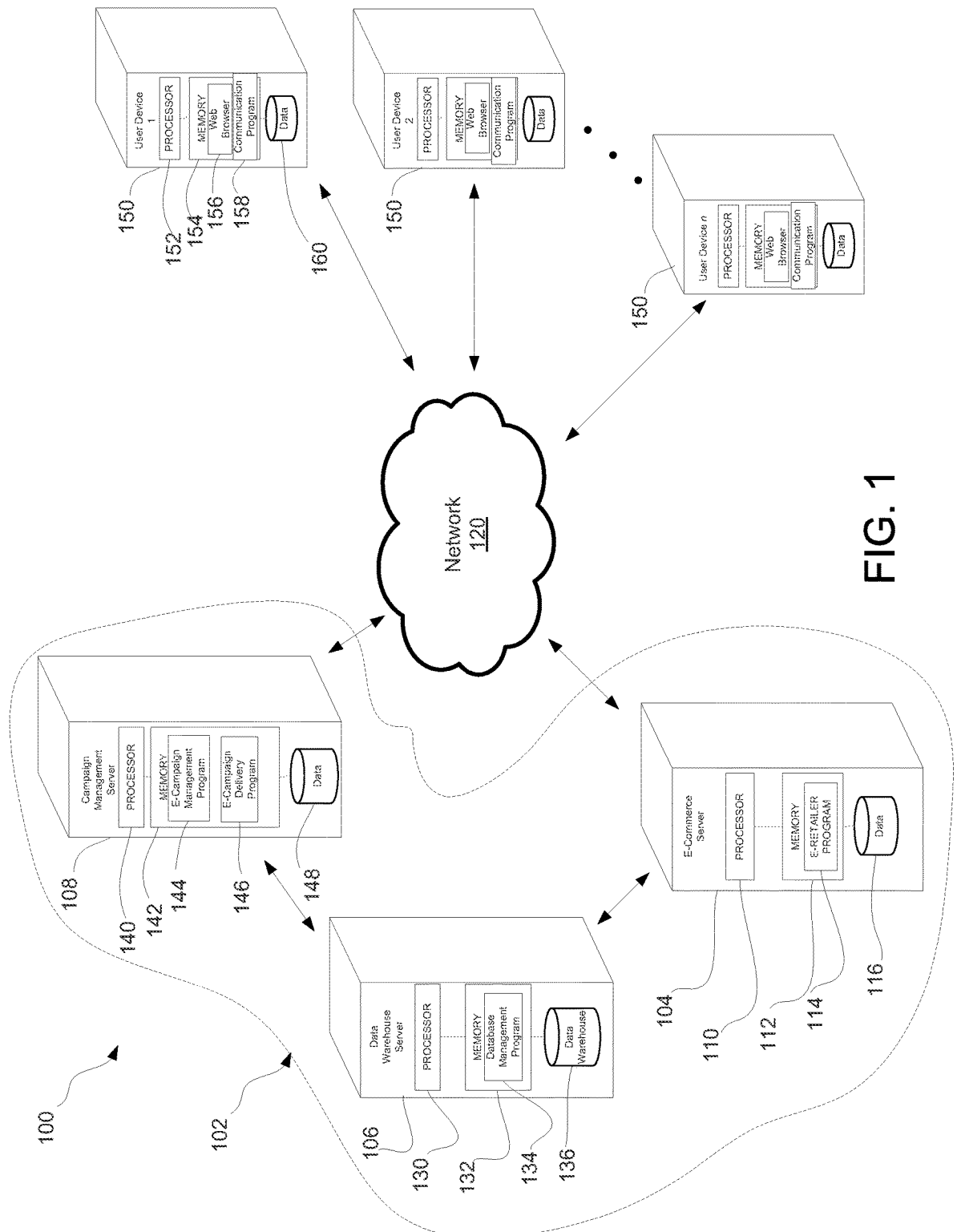
FIG. 1 is a schematic diagram of a system for managing online advertising campaigns pursuant to an illustrative embodiment of the present disclosure.

For the purposes of promoting an understanding of the principles in accordance with the disclosure, reference will now be made to the embodiments illustrated in the drawings and specific language will be used to describe them. It will nevertheless be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure claimed.

It must be noted that, as used in this specification and the appended claims, the singular forms "a," "an," and "the" include plural referents unless the context clearly dictates otherwise. In describing and claiming the present disclosure, the following terminology will be used in accordance with the definitions set out below. As used herein, the terms "comprising," "including," "containing," "having," "characterized by," and grammatical equivalents thereof are inclusive or open-ended terms that do not exclude additional, unrecited elements or method steps.

Various embodiments of the present invention advantageously provide systems, devices, programs, non-transitory computer readable mediums, and methods for managing multiple e-marketing campaigns to reduce user fatigue and to increase user responses.

Referring now to FIG. 1, according to examples of embodiments of the present invention, a system 100 can be utilized to conduct e-commerce with users. In particular, the system 100 comprises an e-commerce enterprise 102. The e-commerce enterprise 102 comprises a plurality of servers, including an e-commerce server 104, a data warehouse server 106, and an e-campaign management server 108. The e-commerce enterprise 102 may include additional servers. Further, it will be appreciated that the e-commerce server 104, the data warehouse server 106, and the e-campaign management server 108 may be located in the same physical location or at remote physical locations.

In an illustrative embodiment, the e-commerce server 104, the data warehouse server 106, and the e-campaign management server 108 may each comprise multi-processor computers, server farms, multiple computer systems, multiple databases and storage devices (including hierarchies of storage and access), and other implementations that will be recognized by those having skill in the art as encompassed within the embodiments of the present invention. For example, a single computer, a plurality of computers, a server, or server cluster or server farm may be employed to implement each of the e-commerce server 104, the data warehouse server 106, and the e-campaign management server 108, and this disclosure does not limit any configuration of computers and servers for each.

Moreover, each of the e-commerce server 104, the data warehouse server 106, and the e-campaign management server 108 may each be deployed as a server farm, data center or server cluster managed by a server host, and the number of servers and their architecture and configuration may be increased based on usage, demand, and capacity requirements for the system. Moreover, illustrative embodiments of the e-commerce server 104, the data warehouse server 106, and the e-campaign management server 108 may each include clusters of computers, servers, storage devices, display devices, input devices and other components interacting together, as understood by those skilled in the art.

As illustrated in FIG. 1, the e-commerce server 104 includes a processor 110 coupled to a memory 112. Stored in the memory 112 is an e-retailer program 114 that contains instructions that are executable by the processor 110. The e-commerce server 104 may also include a storage medium 116 for storing operational data. When executed, the e-retailer program 114 allows users at remote computing devices 150 to engage in e-commerce with the e-commerce server 104.

In particular, each remote computing device 150 may include a processor 152 coupled to a memory 154. Each remote computing device 150 may further include one or more user input devices (not shown) such as computer mouses, keyboards, and touch screens. In an illustrative embodiment, stored in the memory 154 may be a web browser program 156. As is known to one having ordinary skill in the art, the web browser program 156 is a program used for retrieving, presenting, and traversing information resources on the World Wide Web over the network 120. To engage in e-commerce with the e-commerce server 104, users navigate to a website hosted by the e-commerce server 104 using the web browser program 156. The users may then buy goods or services electronically from the e-commerce server 104 using the web browser program 156.

To facilitate e-commerce, the e-retailer program 114 may provide a search feature whereby users can search for desired products listed for sale on the website hosted by the e-commerce server. For example, the e-retailer program 114 may provide product webpages featuring products for sale. The e-retailer program 114 may provide a checkout procedure such that users can provide payment, shipping, and contact information for purchased products.

In an illustrative embodiment, users may be prompted by the e-retailer program 114 to register with the e-commerce enterprise 102. To register, users may be required to provide electronic contact information, such as an e-mail address or a cell phone number capable of receiving texts. In addition, the e-retailer program 114 may prompt users to provide demographic information, including age, income, gender, hobbies, and general interests. Additional demographic information about users may be obtained from third-party sources.

The remote computing devices 150 may each include a communication program 158. The communication program 158 may enable the remote computing devices 150 to send and receive electronic messages. In an illustrative embodiment, the communication program 158 is an email program. In another illustrative embodiment, the communication program 158 is a texting program. In still another illustrative embodiment, the remote computing devices 150 may include a storage medium 160 for storing operational data.

In yet another illustrative embodiment, the communication program 158 may be a web browser that allows users to access online communication websites, such as Gmail, Yahoo, MSN, or any other websites that provide email services of the web.

In an illustrative embodiment, the remote computing devices 150 are computers, such as desktop or laptop computers. In another illustrative embodiment, the remote computing devices 150 are smart phones. In still another illustrative embodiment, the remote computing devices 150 are tablet computers, smart music players or wireless web-enabled electronic devices. Thus, it will be appreciated that the remote computing devices 150 can take a wide variety of forms, all of which fall within the scope of the present disclosure. In an illustrative embodiment, the e-retailer program 114 includes a tracking feature on webpages that tracks information about users as the users interact with the e-commerce server 104 from the remote computing devices 150. In an illustrative embodiment, the tracking feature is operated by a third party. In an illustrative embodiment, the tracked information can include a wide range of information, including, but not limited to, products viewed, search terms used in product searches, purchases made, products placed in a virtual shopping cart but not purchased (sometimes referred to as "abandoned carts"), and other information that may indicate a user's interest in a product. In an illustrative embodiment, a third-party entity may track the users' interaction with the e-commerce server 104 as is known to one having ordinary skill in the art. As used herein, the term "product" may refer to a product or a service.

The user information, described above, is organized and stored by the data warehouse server 106. The data warehouse server 106 includes a processor 130 coupled to a memory 132. Stored in the memory 132 is a database management program 134 that contains instructions that are executable by the processor 130. The data warehouse server 106 may also include a storage medium 136 for storing the warehoused data in a database format as is known to those skilled in the art. As used herein, the term "storage medium" may refer to a hard disk array that links multiple physical hard drives into one large "drive" for advanced data control.

The database management program 134 is software that controls the creation, maintenance, and use of the database of user information on the storage medium 136. The database management program 134 may perform operations on the database, such as a query of the database for requested information. The data warehouse server 106 may also include product information. In an illustrative embodiment, the product information may include images and product descriptions. In another illustrative embodiment, the product information may further include pricing information.

The e-campaign management server 108 includes a processor 140 coupled to a memory 142. Stored in the memory 142 is an e-campaign management program 144 and an e-campaign delivery program 146, each of which contains instructions that are executable by the processor 140. The e-campaign management server 108 may also include a storage medium 148 for storing data, as is known to one having ordinary skill in the art.

In an illustrative embodiment, the e-campaign management program 144 allows the operator of the e-commerce enterprise 102 to define e-marketing campaigns. In particular, the e-campaign management program 144 allows the operator to define the recipients for an e-marketing campaign. As used herein, an e-marketing campaign can be an advertising campaign performed using a communications network.

In addition, the e-campaign management program 144 allows the operator to define the e-marketing contents of the electronic messages of e-marketing campaigns. In an illustrative embodiment, the e-campaign management program 144 allows the operator to define a template with variables. The variables are populated with data. The e-marketing contents may include customized text and graphics. The e-marketing contents may include links to product webpages hosted by the e-commerce server 104 on the network 120. The delivery channels for an e-marketing campaign include, but are not limited to, email, text messages, banner ads, websites, etc. It will be appreciated that e-marketing content can be provided through any electronic communication channel. The network 120 may include wired and wireless networks.

The e-campaign management program 144 allows multiple e-marketing campaigns to be ongoing simultaneously. E-marketing campaigns may be run automatically on a recurring basis. For example, e-marketing campaigns may be defined to run hourly, daily, weekly or monthly. Additionally, e-marketing campaigns may be run on a one-time basis, such as in the case of a special promotion on a product.

To initiate an e-marketing campaign, the e-campaign management program 144 allows an operator to define a target profile for the recipients. For example, the target profile may include all users who abandoned a product in a virtual shopping cart within a preset time period, such as within the last 24 hours. In another example, the target profile may include all users who may be potentially interested in a particular product. In another example, the target profile may include all users who have selected to receive advertisements.

Once the operator has defined the target profile, the e-campaign management program 144 allows the operator to define the e-marketing content for the campaign. To facilitate customized content, the e-campaign management program 144 allows an operator to create a template for the e-marketing content. In an illustrative embodiment, the e-marketing content is customized for each recipient using the template. For example, for an abandoned cart campaign, the e-marketing content may include an image of the product that was abandoned by the user as well as a link to a specific product webpage hosted by the e-commerce server 104. Other campaigns, such as for a special promotion for a product, may send the same e-marketing content. But, even for these type of campaigns, some of the e-marketing content may be customized, such as the name of the user.

The e-campaign management program 144 allows an operator to assign a priority level or ranking to each e-campaign. In particular, e-campaigns that have historically higher response rates are given a higher priority level than e-campaigns with lower response rates. For example, an e-campaign that targets users who have recently abandoned an item in a virtual shopping cart may be given a higher priority level than an e-campaign that features a product. This is because abandoned cart e-campaigns typically have a relatively high response rate as compared to e-campaigns that just feature a product.

The e-campaign management program 144 may allow an operator to assign a run time. In an embodiment, an e-campaign may run hourly, daily, weekly, or monthly. For example, the e-campaign management program 144 may run an abandoned cart campaign daily. The e-campaign management server 108 may generate multiple e-campaigns concurrently.

To form an e-campaign, the e-campaign management program 144, performs a query of the user information maintained by the data warehouse server 106. In particular, the e-campaign management program 144 requests that the data warehouse server 106 identify those users whose profile matches the target profile defined by the operator. In addition, the e-campaign management program 144 requests that the data warehouse server 106 return the necessary e-marketing content for each user. Again, the e-marketing content includes information necessary to complete the template for the e-marketing campaign, including, but not limited to, user name, user contact information, link information to product webpages, product images, product price, and any other information necessary to populate the template. In an illustrative embodiment, the e-commerce server 104, the data warehouse server 106, and the e-campaign management server 108 are connected over a local area network or a wide area network.

Figure 2:
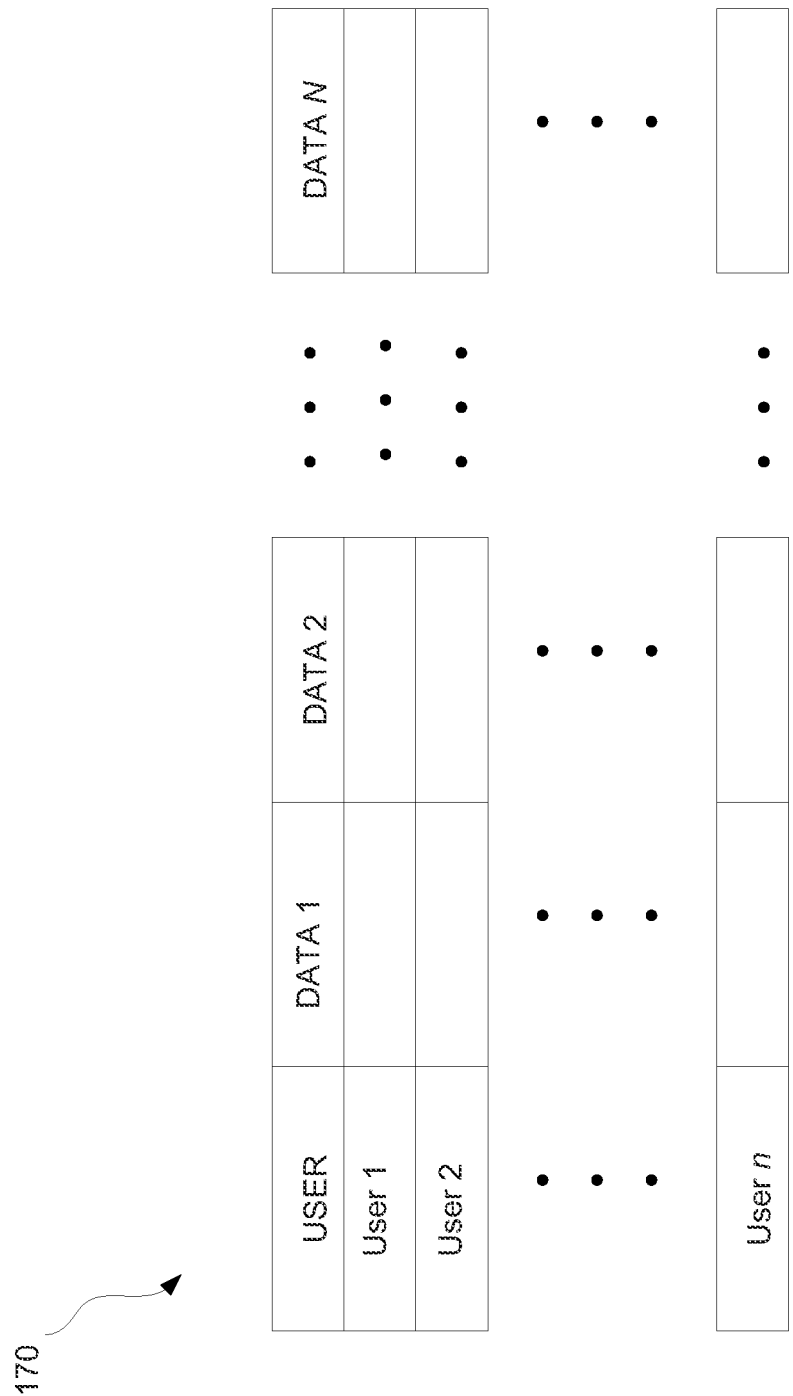
FIG. 2 is a schematic diagram of a table of user data in a data warehouse of an e-commerce enterprise pursuant to an illustrative embodiment of the present disclosure.

The e-campaign management program 144 stores the returned information from the data warehouse server 106 using data tables in the storage medium 148. For example, the data, or data location, to be utilized for each targeted user are stored in a row of a data table 170 as shown in FIG. 2. The data table 170 may identify each user by a user ID number. The Data 1 through Data N may include the data necessary to complete a customized template for each user. The Data 1 through Data N may further include contact information for the user, such as an email address or cell phone number.

In an illustrative embodiment, the e-campaign management program 144 allows the operator to define a maximum number of electronic communications received by a user within a given time frame. For example, the operator may specify that a user may not receive more than one electronic communication from the e-commerce enterprise 102 per day.

Once the data table 170 is complete, there is typically a brief period of time between the completion of the data table 170 and the actual implementation of the e-marketing campaign, i.e., the transmission of the electronic messages to the targeted users. During this time period, the e-campaign management program 144 may suppress a user from an e-marketing campaign if the number of electronic communications sent to that user within a predetermined time frame exceeds the threshold established by the operator of the e-commerce enterprise 102.

In addition, during the time period between the identification of the targeted users and the actual implementation of an e-marketing campaign, i.e., the transmission of the electronic messages to the targeted users, the e-campaign management program 144 compares the priority level of all co-pending e-marketing campaigns. In an illustrative embodiment, targeted users in low priority e-marketing campaigns are suppressed in favor of high priority e-marketing campaigns. As will be explained below, this is accomplished by comparing the data tables 170 of different e-marketing campaigns and determining users who are targeted in both campaigns. Targeted users appearing in multiple e-marketing campaigns are suppressed from the lower priority campaigns.

Figure 3:
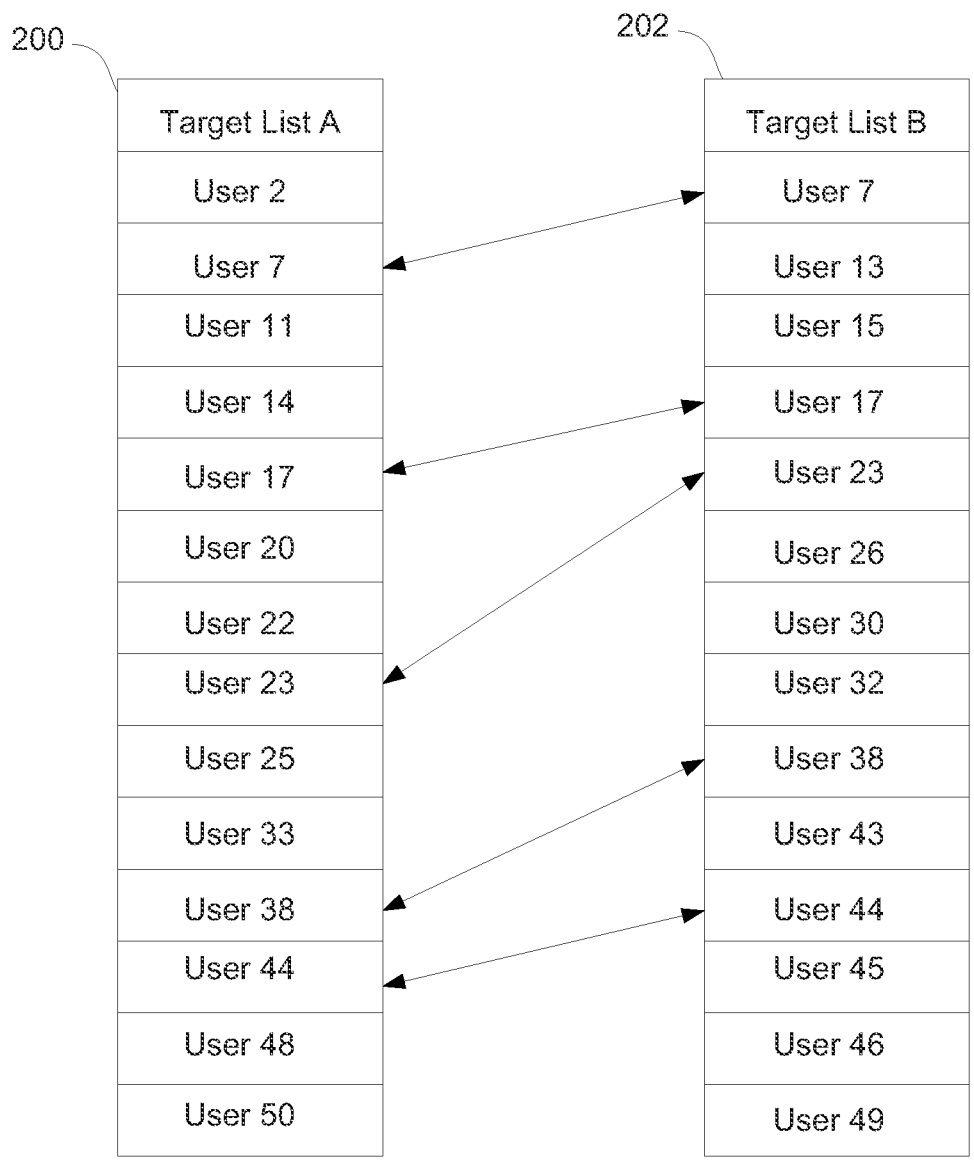
FIG. 3 depicts exemplary lists of targeted users for online marketing campaigns pursuant to an illustrative embodiment of the present disclosure.

Referring now to FIG. 3, there is depicted an exemplary data table 200 for a first campaign, labeled as "Target List A," and an exemplary second data table 202 for a second campaign, labeled as "Target List B." It will be appreciated that the data tables 200 and 202 may contain additional data such as explained in relation to the data table 170 depicted in FIG. 2. However, for purposes of clarity, only one column in each of data tables 200 and 202 is depicted.

As can be observed, each of the data tables 200 and 202 comprises a list of targeted users for each of their respective e-marketing campaigns. As can be further observed, the list of targeted users in each of the data tables 200 and 202 comprises some of the same targeted users. For example, User 7 appears in both data tables 200 and 202. In this example, the second campaign, represented by data table 202, has a higher priority than the first campaign, represented by data table 200.

Figure 4:
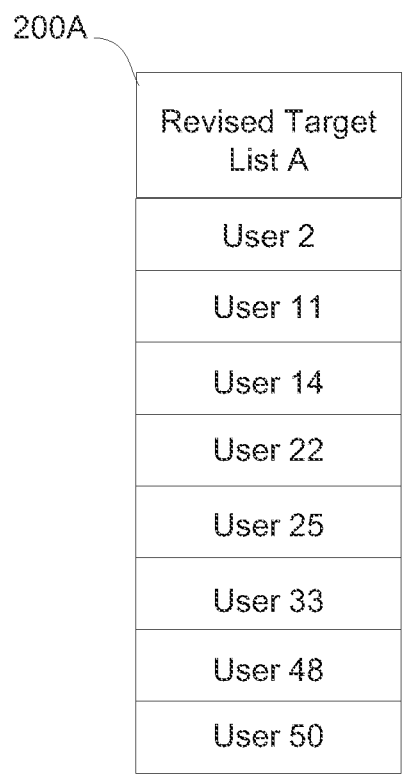
FIG. 4 depicts a revised or suppressed exemplary list of targeted users for an online marketing campaign pursuant to an illustrative embodiment of the present disclosure.

Referring now to FIG. 4, there is depicted a revised data table 200A for the first campaign. In particular, those targeted users in the second campaign, see data table 202 in FIG. 3, have been suppressed from the first campaign by the e-campaign management program 144 on the server 108. As used herein, the term "suppress" may refer to preventing targeted users from receiving an electronic communication in conjunction with a campaign. Thus, the targeted users appearing in both the data tables 200 and 202, see FIG. 3, will only receive an electronic communication associated with the second campaign, data table 202, since it has been assigned a higher priority level than the first campaign, data table 200.

Once the e-campaign management program 144 has suppressed targeted users from low-level priority campaigns, the e-campaign delivery program 146 on the campaign management server 108 forms and delivers the electronic messages to the targeted users as is known to those skilled in the art. Again, this may include emailing or texting the targeted users with a customized electronic communication.

Figure 5:
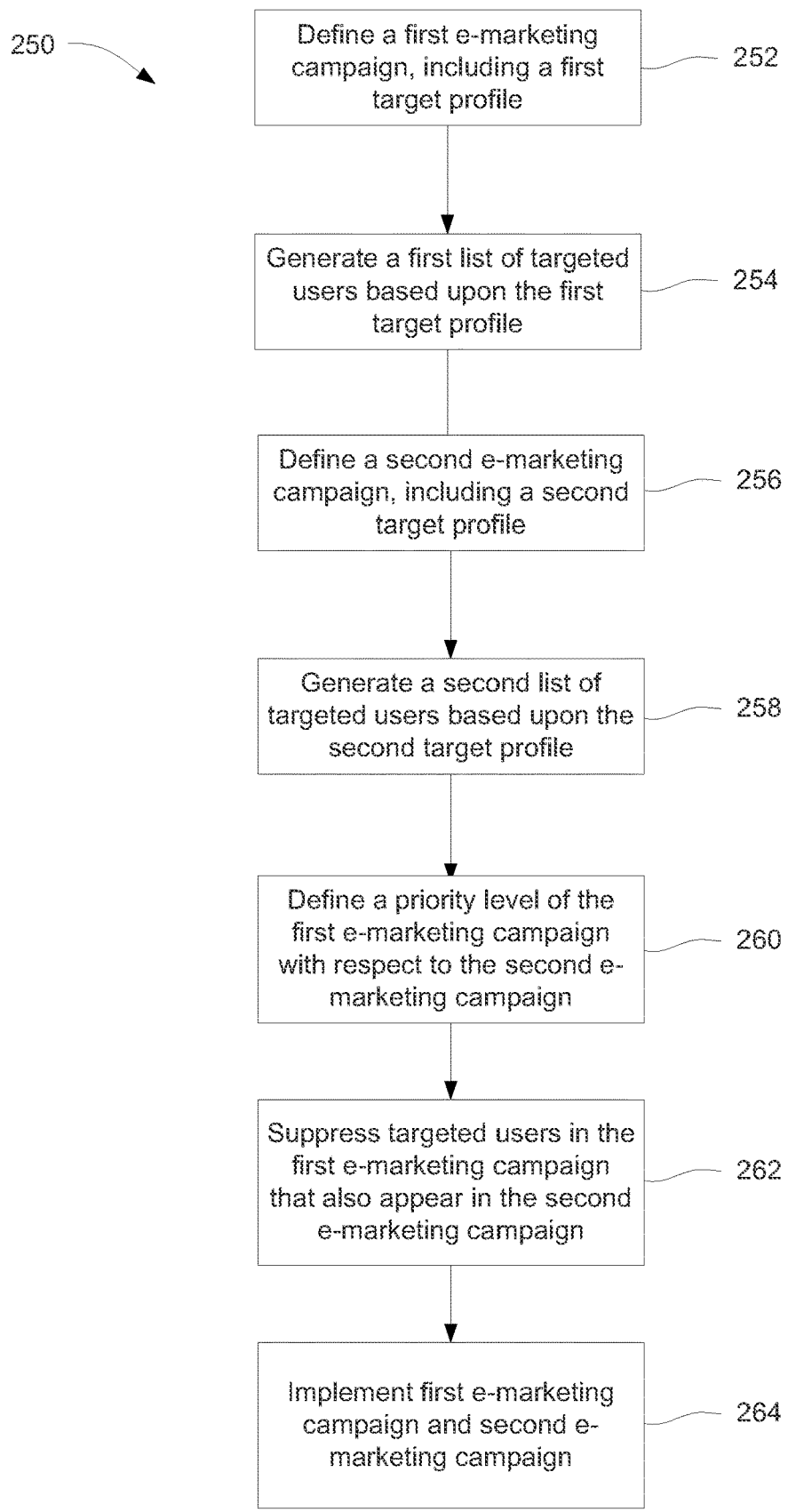
FIG. 5 is a schematic flow chart of a method of managing multiple e-marketing campaigns according to an illustrative embodiment of the present disclosure.

Referring now to FIG. 5, there is depicted a flow diagram 250 for suppressing a first e-marketing campaign based on a higher priority and second e-marketing campaign pursuant to an illustrative embodiment of the present disclosure. At step 252, an operator of an e-commerce enterprise defines a first e-marketing campaign, including a first target profile. At step 254, a computer server generates a first list of targeted users from a list of users of an e-commerce website based upon the first target profile. At step 256, an operator of an e-commerce enterprise defines a second e-marketing campaign, including a second target profile. At step 258, a computer server generates a second list of targeted users from a list of users of an e-commerce website based upon the second target profile. At step 260, a priority level of the first e-marketing campaign is defined with respect to the second e-marketing campaign. At step 262, those targeted users in the first e-marketing campaign that also appear in the second e-marketing campaign are suppressed from the first e-marketing campaign using a computer server. At step 264, the first e-marketing campaign and the second e-marketing campaign are implemented by forming and delivering electronic messages to the targeted users.

In an illustrative embodiment of the present disclosure, a non-transitory computer readable medium comprises a set of computer readable instructions that, when executed by a processor, cause the processor to perform one or more of the following operations: (i) define a first e-marketing campaign, the first e-marketing campaign comprising a first target user profile, (ii) generate a first data table of targeted users of the e-commerce website based on the first target user profile, (iii) define a second e-marketing campaign, the second e-marketing campaign comprising a second target user profile, (iv) generate a second data table of targeted users of the e-commerce website based on the second target user profile, (v) suppress from the first e-marketing campaign those targeted users in the first data table who also appear in the second data table of the second e-marketing campaign, (vi) define a first message template for the first e-marketing campaign and a second message template for the second e-marketing campaign, (vii) generate and transmit electronic messages to the non-suppressed targeted users in the first e-marketing campaign based on the first message template, (viii) generate and transmit electronic messages to the targeted users in the second e-marketing campaign based on the second message template, and (ix) define a third e-marketing campaign, the third e-marketing campaign comprising a third target user profile and generate a third data table of targeted users of the e-commerce website based on the third target user profile and suppress from the third e-marketing campaign those targeted users in the third data table who also appear in the second data table of the second e-marketing campaign.

In the foregoing Detailed Description, various features of the present disclosure are grouped together in a single embodiment for the purpose of streamlining the disclosure. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment. Thus, the following claims are hereby incorporated into this Detailed Description of the Disclosure by this reference, with each claim standing on its own as a separate embodiment of the present disclosure.

It is to be understood that the above-described arrangements are only illustrative of the application of the principles of the present disclosure. Numerous modifications and alternative arrangements may be devised by those skilled in the art without departing from the spirit and scope of the present disclosure and the appended claims are intended to cover such modifications and arrangements. Thus, while the present disclosure has been shown in the drawings and described above with particularity and detail, it will be apparent to those of ordinary skill in the art that numerous modifications, including, but not limited to, variations in size, materials, shape, form, function, and manner of operation, assembly, and use may be made without departing from the principles and concepts set forth herein.

What is claimed is:

1. A method of creating an e-commerce website facilitating creation of multiple e-marketing campaigns for an e-commerce enterprise, the method comprising:

providing the e-commerce website with a web browser program that retrieves, presents and traverses information sources;

providing an e-commerce server that hosts the e-commerce website and website and enables e-commerce transactions of products and services via the e-commerce website;

providing a data warehouse server comprising a processor coupled to memory, a database management program, and a storage medium, wherein product information is stored on the data warehouse server;

providing an e-campaign management server comprising a processor coupled to memory, an e-campaign management program, and an e-campaign delivery program;

wherein the e-commerce server, the data warehouse server, and the e-campaign management server are accessible to each other via a network;

causing the data management program of the data warehouse server to collect and store data on a plurality of potential targeted users in the storage medium of the data warehouse server;

defining a first e-marketing campaign using the e-campaign management program, wherein the e-campaign management program allows the operator to (1) define a first target user profile for target users of the first e-marketing campaign; (2) create a first template for the e-marketing content in the first e-marketing campaign, (3) assign a first priority level to the first e-marketing campaign, (4) assign a first run time to the first e-marketing campaign;

causing the e-campaign management program to request data on a plurality of potential targeted users whose profile matches the first target user profile from the data warehouse server, wherein the data warehouse server compares the first target user profile to the data on each potential targeted user to determine users whose profile matches the first target user profile and sends the data on the plurality of potential targeted users whose profile matches the first target user profile to the e-campaign management program on the e-campaign management server;

causing the e-campaign management program to generate a first data table of targeted users of the first e-marketing campaign comprising the plurality of potential targeted users whose profile matches the first target user profile and store the first data table of targeted users in a storage medium on the e-campaign management server;

causing the e-campaign management server to generate at least one message to each of the targeted users of the first e-marketing campaign, wherein the at least one message is generated by filling in at least one template with e-marketing content and user information for the targeted users of the first e-marketing campaign;

defining a second e-marketing campaign using the e-campaign management program, wherein the e-campaign management program allows the operator to (1) define a second target user profile for target users of the second e-marketing campaign; (2) create a second template for the e-marketing content in the second e-marketing campaign, (3) assign a second priority level to the second e-marketing campaign, (4) assign a second run time to the second e-marketing campaign;

causing the e-campaign management program to request data on a plurality of potential targeted users whose profile matches the second target user profile from the data warehouse server, wherein the data warehouse server compares the second target user profile to the data on each potential targeted user to determine users whose profile matches the second target user profile and sends the data on the plurality of potential targeted users whose profile matches the second target user profile to the e-campaign management program on the e-campaign management server;

causing the e-campaign management program to generate a second data table of targeted users of the second e-marketing campaign comprising the plurality of potential targeted users whose profile matches the first target user profile and store the second data table of targeted users in a storage medium on the e-campaign management server, wherein at least one targeted user appears in both the first data table of targeted users and the second data table of targeted users;

causing the e-commerce server to generate at least one message to each of the targeted users of the second e-marketing campaign, wherein the at least one message is generated by filling in at least one template with e-marketing content and user information for the targeted users of the second e-marketing campaign;

using the e-campaign management program to define a threshold for the number of communications which a given user may receive in a given period of time;

suppressing one or more targeted users of the first and second e-marketing campaigns by removing the targeted users from the first and second data tables if the targeted users received a number of communications greater than the threshold for the number of communications which a given user may receive in a given period of time in the given period of time;

comparing the first priority level and the second priority level to determine which of the first e-marketing campaign and the second e-marketing campaign has a lowest priority level;

comparing the first priority level and the second priority level to determine which of the first e-marketing campaign and the second e-marketing campaign has a highest priority level comparing the first data table of targeted users and the second data table of targeted users using the e-campaign management program and generating a revised data table of targeted users for the determined lowest priority level e-marketing campaign by removing those users in the first data table of targeted users and the second data table of targeted users from the revised data table;

implementing the determined highest priority level first e-marketing campaign by causing the e-commerce server to deliver at least one message to the targeted users of the determined highest priority level e-marketing campaign only to the non-suppressed targeted users appearing in the data table of targeted users of related to the determined highest priority level e-marketing campaign; and implementing the determined lowest priority level e-marketing campaign by causing the e-commerce server to deliver at least one message to the targeted users of the determined lowest priority level e-marketing campaign only to the non-suppressed targeted users appearing in the revised data table related to the determined lowest priority level e-marketing campaign.

2. The method of claim 1, further comprising defining a first message template for the first e-marketing campaign and a second message template for the second e-marketing campaign, the first message template and the second message template including variables.

3. The method of claim 2, wherein said first data table is generated to include data indicated by the variables in the first message template and the second data table is generated to include data indicated by the variables in the second message template.

4. The method of claim 3, further comprising generating and transmitting electronic messages to the non-suppressed targeted users in the first e-marketing campaign based on the first message template.

5. The method of claim 4, further comprising generating and transmitting electronic messages to the targeted users in the second e-marketing campaign based on the second message template.

6. The method of claim 5, wherein the electronic messages to the non-suppressed targeted users in the first e-marketing campaign and to the targeted users in the second e-marketing campaign are delivered using one of email and texting.

7. The method of claim 1, further comprising:

defining a third e-marketing campaign using a processor of an e-campaign management server, the third e-marketing campaign comprising a third target user profile;

generating a third data table of targeted users of the e-commerce website based on the third target user profile using the processor of the e-campaign management server; and suppressing from the third e-marketing campaign those targeted users in the third data table who also appear in the second data table of the second e-marketing campaign using the processor of the e-campaign management server.

8. The method of claim 1, further comprising assigning a priority level to the first e-marketing campaign and the second e-marketing campaign using the processor of the e-campaign management server.

9. A system for creating an e-commerce website facilitating creation of multiple e-marketing campaigns for an e-commerce enterprise the system comprising:

a processor;

a memory coupled to the processor;

the e-commerce website including a web browser program that retrieves, presents, and traverses information sources, and an e-commerce management program;

an e-commerce server that hosts the e-commerce website and enables e-commerce transactions of products and services via the e-commerce website and the processor;

a data warehouse server comprising a processor coupled to memory, a database management program, and a storage medium, wherein product information is stored on the data warehouse server;

an e-campaign management server comprising a processor coupled to memory, an e-campaign management program, and an e-campaign delivery program, wherein the e-commerce server, the data warehouse server, and the e-campaign management server are accessible to each other via a network; and a set of computer readable instructions stored in the memory, that when executed by the processor;

(I) cause the data warehouse server to collect and store data on a plurality of potential targeted users in the storage medium of the data warehouse server;

(ii) define a threshold for a number of communications that a given user may receive in a given period of time;

(iii) cause the e-campaign management program to define a first e-marketing campaign by accepting input from a user to (1) define a first target user profile for target users of the first e-marketing campaign; (2) create a first template for the e-marketing content in the first e-marketing campaign, (3) assign a first priority level to the first e-marketing campaign, and (4) assign a first run time to the first e-marketing campaign;

(iv) cause the e-campaign management program to request data on a plurality of potential targeted users whose profile matches the first target user profile from the data warehouse server, wherein the data warehouse server compares the first target user profile to the data on each potential targeted user to determine users whose profile matches the first target user profile and sends the data on the plurality of potential targeted users whose profile matches the first target user profile to the e-campaign management program on the e-campaign management server;

(v) cause the e-campaign management program to generate a first data table of targeted users of the first e-marketing campaign comprising the plurality of potential targeted users whose profile matches the first target user profile and store the first data table of targeted users in a storage medium on the e-campaign management server;

(vi) cause the e-campaign management server to generate at least one message to each of the targeted users of the first e-marketing campaign by combining electronic content and user information of the targeted users of the first e-marketing campaign with the first template for e-marketing content, (vi) (vii) cause the e-campaign management program to define a second e-marketing campaign by accepting input from a user to (1) define a second target user profile for target users of the second e-marketing campaign; (2) create a second template for the e-marketing content in the second e-marketing campaign, (3) assign a second priority level to the second e-marketing campaign, and (4) assign a second run time to the second e-marketing campaign;

(viii) cause the e-campaign management program to request data on a plurality of potential targeted users whose profile matches the second target user profile from the data warehouse server, wherein the data warehouse server compares the second target user profile to the data on each potential targeted user to determine users whose profile matches the second target user profile and sends the data on the plurality of potential targeted users whose profile matches the second target user profile to the e-campaign management program on the e-campaign management server;

(ix) cause the e-campaign management program to generate a second data table of targeted users of the second e-marketing campaign comprising the plurality of potential targeted users whose profile matches the second target user profile and store the second data table of targeted users in a storage medium on the e-campaign management server, wherein at least one targeted user appears in both the first data table of targeted users and the second data table of targeted users;

(x) cause the e-campaign management server to generate at least one message to each of the targeted users of the second e-marketing campaign by combining electronic content and user information of the targeted users of the second e-marketing campaign with the second template for e-marketing content, (xi) cause the e-campaign management server to create a revised first data table and a revised second data table by removing the targeted users from the first and second data tables if the targeted users received a number of communications greater than the threshold for the number of communications which a given user may receive in a given period of time in the given period of time;

(xii) cause the e-campaign management server to compare the first priority level and the second priority level to determine which of the first e-marketing campaign and the second e-marketing campaign has a lowest priority level;

(xiii) cause the e-campaign management server to compare the first priority level and the second priority level to determine which of the first e-marketing campaign and the second e-marketing campaign has a highest priority level;

(x) compare the revised first data table of targeted users and the revised second data table of targeted users and generate a further revised data table of targeted users for the determined lowest priority e-marketing campaign by removing those users in the revised first and revised second data tables of targeted users from the further revised data table;

(xi) implement the determined highest priority e-marketing campaign by delivering the at least one message to be sent to the targeted users of the determined highest priority e-marketing campaign only to the non-suppressed targeted users appearing in the revised data table related to the first determined highest priority e-marketing campaign; and (xii) implement the determined lowest priority e-marketing campaign by delivering the at least one message to be sent to the targeted users of the determined lowest priority e-marketing campaign only to the non-suppressed targeted users appearing in the further revised data table related to the determined lowest priority e-marketing campaign.

10. The system of claim 9, wherein the set of computer readable instructions stored in the memory, when executed by the processor, are further operable to cause the processor to perform the operations of: define a first message template for the first e-marketing campaign and a second message template for the second e-marketing campaign.

11. The system of claim 10, wherein the set of computer readable instructions stored in the memory, when executed by the processor, is further operable to cause the processor to perform the operations of: generate and transmit electronic messages to the non-suppressed targeted users in the first e-marketing campaign based on the first message template.

12. The system of claim 11, wherein the set of computer readable instructions stored in the memory, when executed by the processor, is further operable to cause the processor to perform the operations of: generate and transmit electronic messages to the targeted users in the second e-marketing campaign based on the second message template.

13. The system of claim 9, wherein the set of computer readable instructions stored in the memory, when executed by the processor, is further operable to cause the processor to perform the operations of:
define a third e-marketing campaign, the third e-marketing campaign comprising a third target user profile;
generate a third data table of targeted users of the e-commerce website based on the third target user profile; and
suppress from the third e-marketing campaign those targeted users in the third data table who also appear in the second data table of the second e-marketing campaign.

14. The system of claim 9, wherein the set of computer readable instructions stored in the memory, when executed by the processor, is further operable to cause the processor to perform the operations of: assign a priority level to each of the first e-marketing campaign and the second e-marketing campaign.

15. A non-transitory computer medium for creating an e-commerce website facilitating the creation of multiple e-marketing campaigns for an e-commerce enterprise, the non-transitory computer medium comprising:
a web browser program that retrieves, presents, and traverses information sources an e-commerce management program an e-commerce server that hosts the e-commerce website and enables e-commerce transactions of products and services via the e-commerce website;
a data warehouse server comprising a processor coupled to memory, a database management program, and a storage medium, wherein product information is stored on the data warehouse server;

an e-campaign management server comprising a processor coupled to memory, an e-campaign management program, and an e-campaign delivery program, wherein the e-commerce server, the data warehouse server, and the e-campaign management server are accessible to each other via a network a set of computer readable instructions, that when executed by a processor, cause the processor to perform the operations of:

(I) collect and store data on a plurality of potential targeted users on the data warehouse server;

(ii) define a threshold for a number of communications that a given user may receive in a given period of time;

(iii) define a first e-marketing campaign, the first e-marketing campaign comprising a first target user profile, a first priority level, a first runtime, and a first template for e-marketing content, (iv) generate a first data table of targeted users of the first e-marketing campaign by comparing the first target user profile with the collected data for each potential targeted user stored on the data warehouse server, (v) generate a first message to be sent to the targeted users of the first e-marketing campaign by combining electronic content and user information of the targeted users of the first e-marketing campaign with the first template for e-marketing content, (vi) define a second e-marketing campaign, the second e-marketing campaign comprising a second target user profile, a second priority level, a second runtime and a second template for e-marketing content, (vii) generate a second data table of targeted users of the second e-marketing campaign by comparing the second target user profile with the collected data for each potential targeted user stored on the data warehouse server, wherein at least one targeted user appears in both the first data table of targeted users and the second data table of targeted users, (viii) generate a second message to be sent to the targeted users of the second e-marketing campaign by combining electronic content and user information of the targeted users of the first e-marketing campaign with the first template for e-marketing content, (ix) create a revised first data table and a revised second data table by removing the targeted users from the first and second data tables if the targeted users received a number of communications greater than the threshold for the number of communications which a given user may receive in a given period of time in the given period of time;

(x) compare the first priority level and the second priority level to determine which of the first e-marketing campaign and the second e-marketing campaign has a lowest priority level;

(xi) compare the first priority level and the second priority level to determine which of the first e-marketing campaign and the second e-marketing campaign has a highest priority level;

(xii) compare the data table of targeted users related to the highest determined priority campaign and the data table of targeted users related to the lowest determined priority campaign and generating a further revised data table of targeted users for the second lowest determined priority e-marketing campaign by removing those users in the data tables of targeted users related to both the highest and lowest priority campaigns from the further revised data table;

(xiii) implement the determined highest priority e-marketing campaign by delivering the message only to the non-suppressed targeted users appearing in the revised data table related to the determined highest priority e-marketing campaign; and (xiv) implement the determined lowest priority e-marketing campaign by delivering the message only to the non-suppressed targeted users appearing in the further revised data table related to the determined lowest priority e-marketing campaign.

16. The non-transitory computer medium of claim 15, wherein the set of computer readable instructions stored thereon, when executed by the processor, is further operable to cause the processor to perform the operations of: define a first message template for the first e-marketing campaign and a second message template for the second e-marketing campaign.

17. The non-transitory computer medium of claim 16, wherein the set of computer readable instructions stored therein, when executed by the processor, is further operable to cause the processor to perform the operations of: generate and transmit electronic messages to the non-suppressed targeted users in the first e-marketing campaign based on the first message template.

18. The non-transitory computer medium of claim 17, wherein the set of computer readable instructions stored therein, when executed by the processor, is further operable to cause the processor to perform the operations of: generate and transmit electronic messages to the targeted users in the second e-marketing campaign based on the second message template.

19. The non-transitory computer medium of claim 15, wherein the set of computer readable instructions stored therein, when executed by the processor, is further operable to cause the processor to perform the operations of:
define a third e-marketing campaign, the third e-marketing campaign comprising a third target user profile;
generate a third data table of targeted users of the e-commerce website based on the third target user profile; and
suppress from the third e-marketing campaign those targeted users in the third data table who also appear in the second data table of the second e-marketing campaign.

* * * * *